US009396319B2

(12) United States Patent
Shuart et al.

(10) Patent No.: US 9,396,319 B2
(45) Date of Patent: Jul. 19, 2016

(54) METHOD OF CRIMINAL PROFILING AND PERSON IDENTIFICATION USING COGNITIVE/BEHAVIORAL BIOMETRIC FINGERPRINT ANALYSIS

(71) Applicants: Laird H. Shuart, Topeka, KS (US); Marcia L Shuart, Topeka, KS (US); Sharon E Jankowski, Leawood, KS (US); Bruce D Jankowski, Leawood, KS (US); Thomas R. Pfannenstiel, Topeka, KS (US); Dustin M Engelhaupt, Berryton, KS (US)

(72) Inventors: Laird H. Shuart, Topeka, KS (US); Marcia L Shuart, Topeka, KS (US); Sharon E Jankowski, Leawood, KS (US); Bruce D Jankowski, Leawood, KS (US); Thomas R. Pfannenstiel, Topeka, KS (US); Dustin M Engelhaupt, Berryton, KS (US)

( * ) Notice: Subject to any disclaimer, the term of this patent is extended or adjusted under 35 U.S.C. 154(b) by 0 days.

(21) Appl. No.: 14/121,609

(22) Filed: Sep. 24, 2014

(65) Prior Publication Data
US 2015/0096002 A1    Apr. 2, 2015

Related U.S. Application Data

(60) Provisional application No. 61/960,845, filed on Sep. 3, 2013.

(51) Int. Cl.
H04L 29/06 (2006.01)
G06F 21/32 (2013.01)
(52) U.S. Cl.
CPC ..................................... *G06F 21/32* (2013.01)
(58) Field of Classification Search
CPC .................................................. H04L 63/0861
See application file for complete search history.

(56) References Cited

U.S. PATENT DOCUMENTS

| | | | |
|---|---|---|---|
| 2006/0260624 A1 | 11/2006 | Schur et al. | |
| 2007/0112713 A1 | 5/2007 | Seaman et al. | |
| 2008/0098464 A1* | 4/2008 | Mizrah | G06F 21/36 726/5 |
| 2008/0227063 A1 | 9/2008 | Kennedy | |
| 2008/0228043 A1 | 9/2008 | Kennedy | |
| 2011/0131122 A1* | 6/2011 | Griffin | G06Q 40/00 705/35 |
| 2011/0221567 A1 | 9/2011 | Lehnert | |
| 2013/0132091 A1* | 5/2013 | Skerpac | G10L 17/005 704/273 |
| 2014/0020089 A1* | 1/2014 | Perini, II | G06F 21/32 726/19 |
| 2015/0033305 A1* | 1/2015 | Shear | G06F 21/45 726/6 |
| 2015/0379249 A1* | 12/2015 | Liang | G06F 21/32 726/19 |
| 2016/0006730 A1* | 1/2016 | Chari | H04L 63/08661 726/7 |

OTHER PUBLICATIONS

Bonneau, Joseph, et al. "The quest to replace passwords: A framework for comparative evaluation of web authentication schemes." Security and Privacy (SP), 2012 IEEE Symposium on. IEEE, 2012.*
U.S. Appl. No. 12/928,593, filed Jun. 30, 2011, Shuart, et al.

* cited by examiner

*Primary Examiner* — Shawnchoy Rahman

(57) ABSTRACT

A method of criminal profiling and person identification that utilizes an online identity software-based solution which focuses on the cognitive/behavioral aspects of an individual who is attempting to gain or has gained unauthorized access to a computer system or portions of that system, who may be posing as an authorized user of that system. There is an emphasis on identifying the intruder's unique cognitive/behavioral biometric fingerprint while he is creating usable electronic evidence during his criminal behavior in cyberspace.

19 Claims, 5 Drawing Sheets

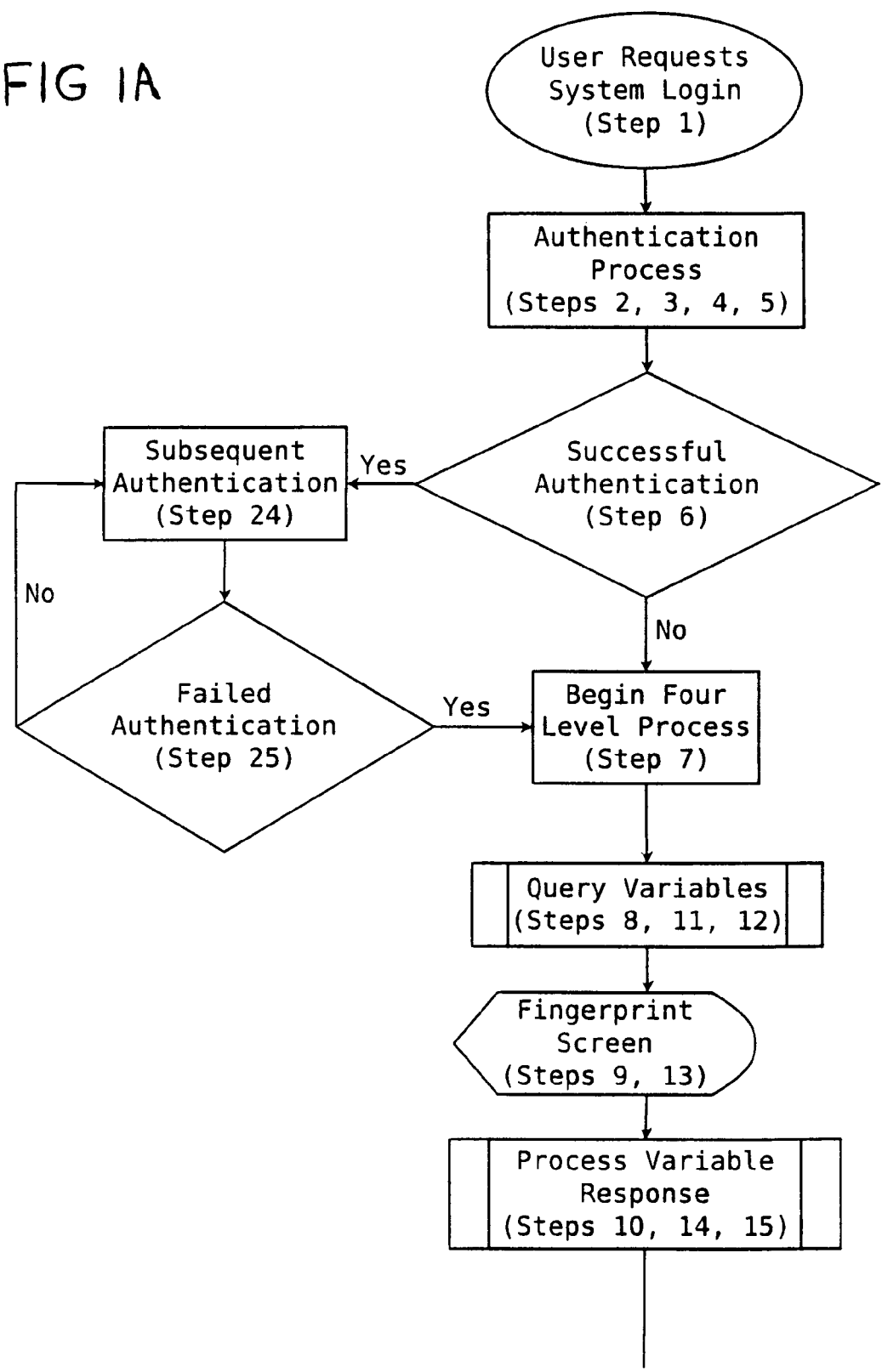

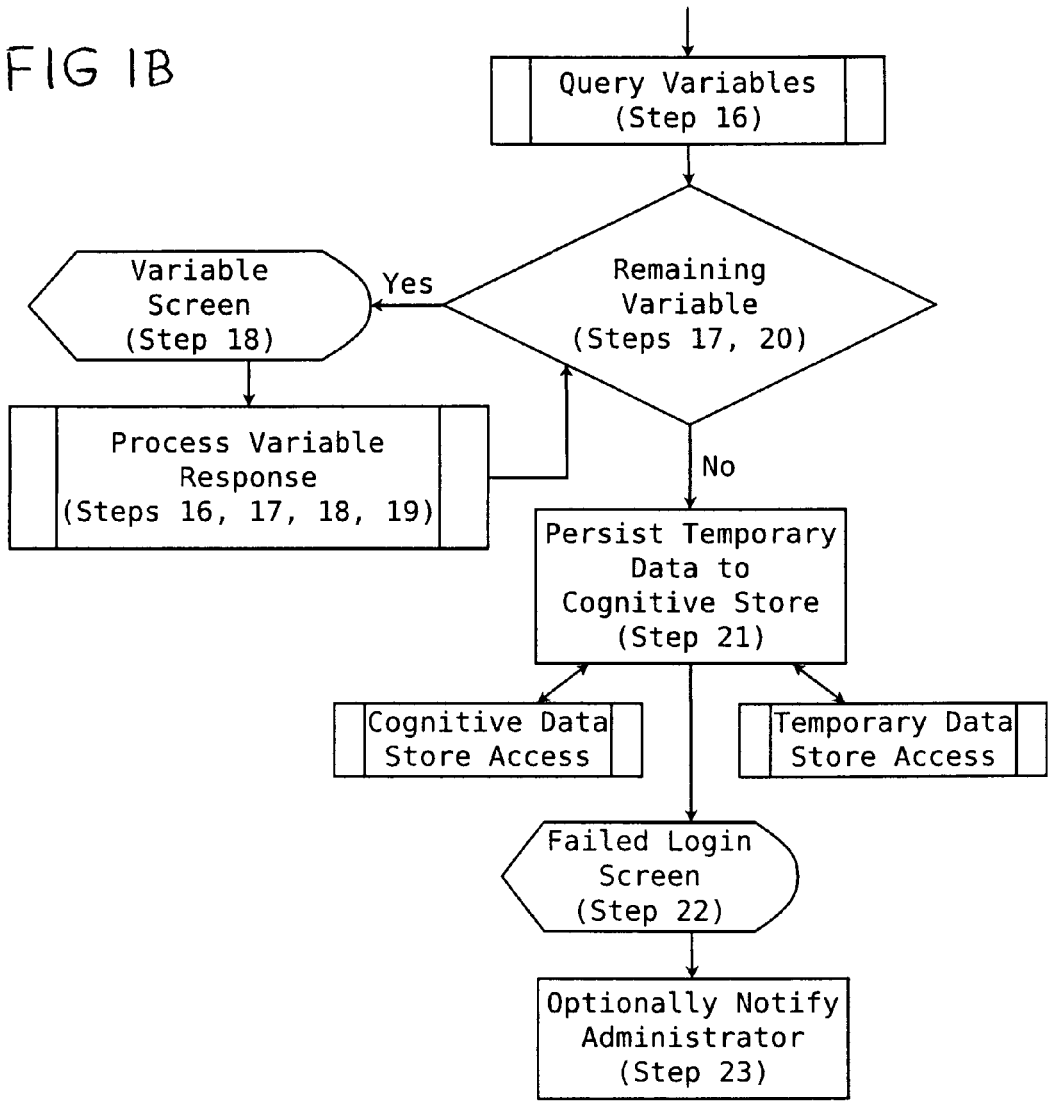

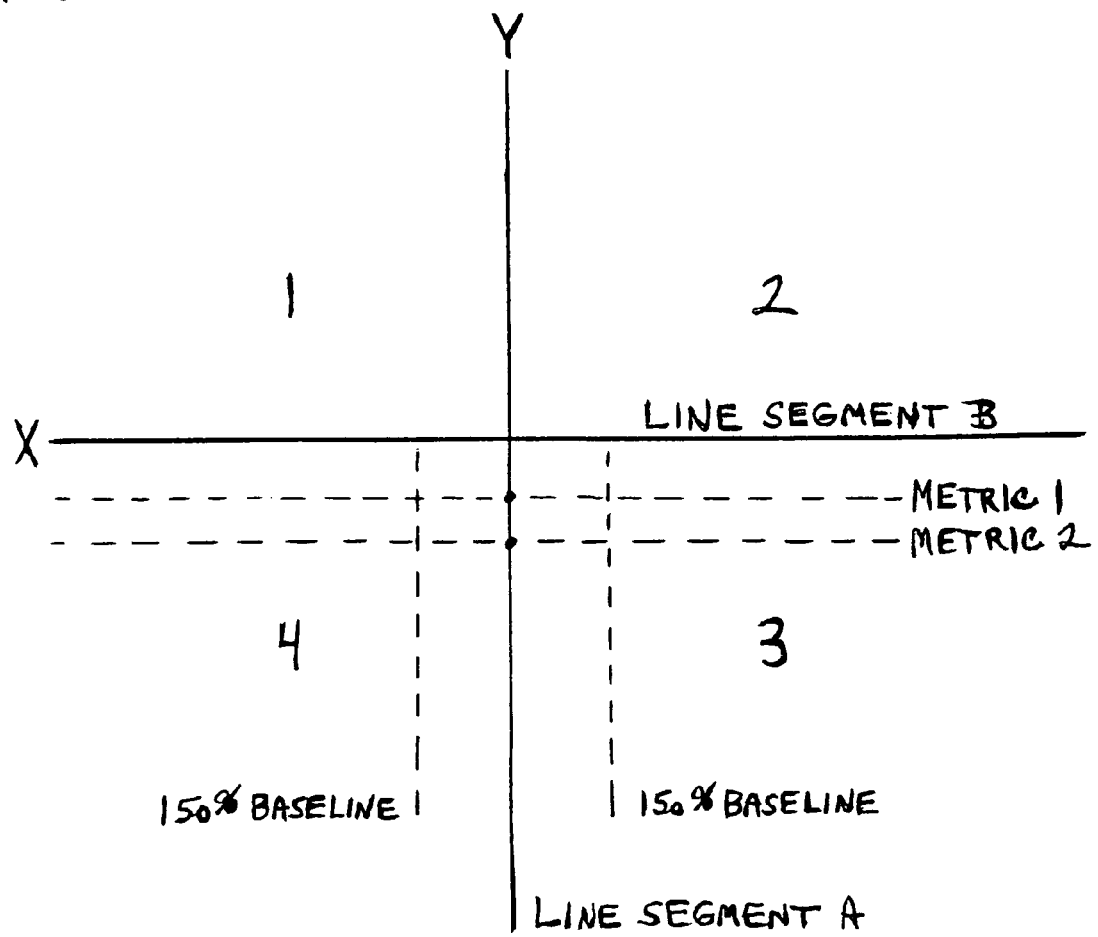

METHOD OF CRIMINAL PROFILING AND PERSON IDENTIFICATION USING COGNITIVE/BEHAVIORAL BIOMETRIC FINGERPRINT ANALYSIS

CROSS-REFERENCE TO RELATED APPLICATIONS

This application claims the benefit of provisional application Ser. No. 61/960,845, filed Sep. 30, 2013.

FEDERALLY SPONSORED RESEARCH

Not Applicable

SEQUENCE LISTING OR PROGRAM

Not Applicable

BACKGROUND

1. Field

This invention relates to online identity software that is part of a computer system's identity management process, which upon execution creates usable electronic evidence and a method of criminal profiling and identifying a person(s) who is attempting to gain or has gained access to a computer system or portions of a system, who may not be designated as an authorized user, and who may be posing as an authorized user of that system—through the utilization of cognitive/behavioral biometric fingerprint analysis.

2. Prior Art

Authentication is the process of verifying a user's identity. In the context of a computer system logon, authentication has traditionally been a two step process. First the user will enter a username, user ID, or other unique sequence of characters that identify the user. To complete the process, the user must enter a pre-selected or pre-assigned password or other unique sequence of characters that is secret and only known to the user and the computer system (i.e. a known shared secret). If these two pieces of logon information successfully correspond, the user is authenticated since theoretically the user is the only individual who could know both pieces of information. In the real world, recognizing an individual is something humans do automatically every day—by recognizing a person's face, their voice, or the way they talk. For generations, people have conducted transactions in face to face situations where these factors can be taken into consideration, and people know and grow to trust each other. The most basic level of trust involves knowing an individual's true identity.

Today we are witnessing the convergence of two fundamental shifts; the move to digital (i.e. non-personal) interactions and transactions, and the emergence of connected mobile computing devices (e.g. smart phones), which means a person can conduct financial and other confidential transactions on the managed computer system they have in their hands at all times. This convergence mandates new trusted methods of person verification, identification, and authentication. Every day millions of significant monetary transactions take place between complete strangers. These monetary transactions take place outside of human sight in cyberspace, often through mobile computing devices where it is impossible to see the full transaction taking place. Banks and other financial services providers are facing unprecedented security risks to their businesses. And as the bank's customers, we are now dependent on their security mechanisms to protect us as transactions are conducted.

Authorization, meanwhile, is a mechanism by which a computer system determines what level of access an authenticated user should be granted to secure resources within the system. For example, a system might be designed to provide certain users with unrestricted access to all directories and files within the system, while other users are permitted to access only certain directories and files. Similarly, a database management system might provide certain users with the ability to read, write, edit, delete, or upload files, while other users are limited to read-only access.

Because password based authentication systems can be attacked with brute force, passwords (which most people write down) may be stolen or falsely obtained through social networking, or purposely or unintentionally divulged by the user thereby rendering the computer system susceptible to unauthorized access, some systems use additional or alternate methods of authentication and/or authorization to address identity based security threats. For example, a system may require the presence of a physical token, such as a card with a magnetic strip that can be swiped by the user and read by the system. Other systems may rely on the use of biometrics, or characteristics (physical, cognitive, or behavioral) that can be used to distinguish one individual from another through the use of digital equipment. Examples of biometrics that may be used to authenticate a user's identity include 2D face, 3D face, hand geometry, fingerprint, palm, full hand, signature, finger vein, iris, retina, ear, DNA, typing rhythm, gait.

The use of biometrics signals an important shift in the authentication field in that rather than simply verifying an object possessed by the user (i.e. a proxy for the user), such as a known shared secret password ("what the user knows"), or a physical token ("what the user has"), the system is able to analyze and verify the inherent traits and characteristics of the user himself ("what the user is"). As opposed to a password only system, certain biometric authentication metrics create the added ability to identify the actual person using the computer system at any given time. By utilizing a method of continuous authentication, a specific person can be identified and recognized throughout a complete logon session, confirming that the system is still being utilized by the individual who initially logged onto the computer. Such a method also makes it possible to recognize that an intruder has hijacked an already authenticated session after an authorized identity has already been corroborated. To address these types of identity related security threats, a system's normal identity management process should have the capability to identify/recognize other individuals who have obtained at least a threshold level of access to a computer system who are not designated as authorized users, including intruders posing as authorized users.

Both authentication and authorization are useful for controlling access to computer systems and areas within those systems where sensitive information is stored. The Computer Fraud and Abuse Act and other similar legislation designed to address cyber security, computer fraud, cyber crime, and cyber terrorism make it a crime for a person to knowingly access a computer system without authorization, or to exceed his stated access level. A computer system should also be flexible enough to authenticate a user, as well as set his authorization level, independently of each other. This feature adds authentication strength to the system by protecting the system from both authorized users and who might pose a threat to the system, as well as intruders posing as authorized users. It also facilitates contextual authentication, by allowing the system to require more proof of the user's identity as the risk level of a transaction escalates.

Computer security is one place where the real world and the digital world intersect. However, since they each require a different type of security mechanism, one mechanism will not protect both worlds. In the real world you can check identification and verify that a user is really the person he claims to be using a number of identification methods, and you can be fairly confident that person will not change into someone else later after being admitted to the secure area; at least not physically. In cyberspace however, just because the right person logs into a site or service, that doesn't guarantee that you are still dealing with the same person later in the logon session when an actual transaction takes place. When sensitive information is involved, there is a strong case to be made for continuous verification of a user's identity, The online behavior of an authorized user can open the door to an intruder during an active logon session through spoofing or other tricks. It is also important to realize that an IT system may be very secure in and of itself, but a user may not protect his username and password as he should, or those could be stolen or hacked, which means an intruder can acquire legitimate credentials to gain access to the system posing as an authorized user. Even in systems where a user is logged off automatically after a short period of time, such as when he leaves his workspace for a few minutes, the system can be hi-jacked before he returns. Many cybersecurity experts believe that the best ways to defend a computer system are to constantly authenticate the user, and to watch for abnormal behavior, including any abnormal behavior by an authorized user who might have bad intentions or might otherwise pose a security risk to the system by his behavior or mental state. In today's world, computer security mechanisms—designed for user convenience—often favor a person trying to attack a system.

Compounding all these issues, is the fact that in today's society what is considered private and public information is not really synchronized with the security requirements needed for our technology. For instance, look at the amount of personal information disclosed by people on social networks every day.

The concerns previously mentioned and other identity related security threats can at least be partially addressed in identity management systems that authenticate the user through cognitive biometrics (i.e. the specific response of that user's brain to certain stimuli). Cognition, a term which refers to both the mind and the brain, can be defined as the "application of the process of thought to knowing" (i.e. thinking) to create new knowledge. Behavior, and therefore behavioral biometrics, can be considered as a complex interaction between cognition, affect, and conation, and as such, can serve as an additional authentication factor reflecting "who the user is" and "what the user typically does". Cognition involves conscious activity and forms the basis of our intellectual capacities. A user's cognitive function, or the brain mechanisms involved with thinking, reasoning, learning, and remembering ("what the user is"), can be determined through his responses to certain prompts that measure, among other things, his attention, awareness, comprehension, computational linguistics, concentration, decision making, executive function, forensic authorship, judgment, logical thinking, long-term memory, math skills, perception, planning, problem-solving, short-term memory, structural semantics, symbolic thinking, visual-spatial recognition, verbal fluency, phonemic fluency, and working memory. Questions and mental exercises that measure an individual's cognitive function have been used for years in the fields of psychology, psychiatry, education, and human resource management for a variety of purposes, but have yet to be used as a basis for recognizing, profiling, and identifying an intruder as disclosed herein.

In the short term, a user's pattern of responses to certain types of questions provide a basis for authenticating the user through cognitive biometrics. However, if the responses are accumulated over time, they can be used further to form the basis of a recognizable cognitive/behavioral biometric fingerprint unique to that user. The ability to recognize a user for authentication purposes by analyzing his cognitive/behavioral biometric fingerprint, can be redirected to identify an intruder who is trying to gain, or has already gained unauthorized access to a computer system.

One measure of the authentication strength of a computer system is how difficult it is for an imposter to masquerade as an authorized user of the system. Authentication may be undermined by at least two kinds of attacks. Attacks in which the attacker is by some means able to corroborate a falsely claimed digital identity and thus log in as an authorized user of the system, and session hijacking attacks in which the attacker attempts to take control of an already authenticated session after a legitimate user's claimed digital identity has already been corroborated. Session hijacking attacks bypass the system's normal identity management system and can succeed no matter how strong the authentication method is. For that reason alone, authentication strength should take into account the risks that authorized users present—such as being cognitively impaired while accessing the system. Greater security is required in this new mobile world—"the internet of devices"—the "cloud" world. This means that protecting the network and computer system, the data in the system, the computing devices used to access those systems, and the user himself is mandatory—at all times, as a user moves from device to device. That means using a combination of improved access control techniques for systems and devices, stronger data encryption, information that is encrypted at rest and in transit, independent authentication and authorization requirements, multi-factor authentication that includes cognitive/behavioral biometrics—"what the user is", context authentication, continuous authentication, and creating a new type of "trusted credential" tied directly to the user, and that goes with the user as he moves from device to device. A trusted credential could keep data more secure, devices more secure, and the user himself more secure. The user is the "constant" factor in addressing the security issues outlined previously.

Multi-factor authentication is gaining traction at this point in time, because of the need to enhance network, PC, and internet security. One of the driving forces behind this is regulatory compliance. For example, the largest division of the FBI, the Criminal Justice Information System (CJIS) has an Advanced Authentication compliance requirement which is making law enforcement and local governments take action. Effective Sep. 30, 2013 Advanced Authentication is a requirement for all law enforcement personnel accessing NCIC criminal justice information outside of a secure location. Other regulatory compliance standards such as those for the FFIEC and HIPAA, are driving the market towards two-factor authentication. Two-factor authentication is only a start, multi-factor authentication is really needed.

Multi-factor authentication creates layered security, which creates multiple checkpoints. The weakness of one checkpoint is offset by the strength of another checkpoint in the process. These authentication checkpoints, that create multiple opportunities to recognize and potentially stop an intruder, also create multiple profiling opportunities if an intruder does gain access to the system. Layered security also requires evidence which has separate range of attack vectors, requiring would be intruders to have a more complex attack plan to be successful. Increasing the strength of authentication can be done by adding factors from the same or different kinds of authentication categories that don't have the same vulnerabilities. Multi-factor authentication methods include "what the user knows", "what the user has", "what the user is", "what the user typically does" (behavioral habits that are independent of physical biometric attributes), and "context" (location, time, party, prior relationship, etc."). Requiring two or more factors from the same or different categories creates two-factor authentication, and requiring any combination of two or more factors from different categories creates multi-factor authentication.

Some multi-factor authentication methods involve going beyond or even removing a hard to remember password and/or other proxy for the user, and instead focus on making the user himself his actual password. As we continue to move toward biometric authentication systems where the user's behavior, cognitive function, and/or cognitive/behavioral biometric fingerprint (also referred to as "cognitive fingerprint") are used for authentication in higher risk transactions, for example, and a computer system's identity management system or the specific computing device he is trying to use fails to authenticate him, the question will arise as to whether the system has a glitch in it, he is an intruder who is posing as the authorized user, or whether he is who he claims to be but has some type of impairment that affects his cognitive function and/or cognitive/behavioral biometrics, such as extreme fatigue, an illness or infirmity, an uncharacteristic emotional state, or the fact that he has used alcohol or other drugs or medications. These things bring the authentication term "false rejection" into question, and mandate creating a somewhat more appropriate authentication category such as "user not recognizable—or user is impaired".

The afore mentioned types of issues do not typically arise when only proxies for a user are involved in the authentication process. Password based authentication systems would normally authenticate any person, including a potential intruder, presenting a username and password, or "something else the user has" like an identification token, if applicable, unless the administrator of the computer system has been advised these credentials have been compromised or they are no longer valid for some other reason. An intruder may reveal himself as such by presenting credentials that have been reported stolen, and the system's administrator knowing this, will need to determine how far into the authorization process the intruder should be allowed to go. This could mean throwing him off the system immediately. However, learning his identity may be a better alternative, especially if he is another registered user (or former user) of the same IT system; in other words an "insider".

Recognizing an authorized user can be problematic if the user has some type of temporary impairment, and therefore a cognitive biometric authentication system needs to be able to identify the user's deepest thinking patterns that make him unique—a "core" self that is revealed regardless of the user's current mental state, level of cognitive function, or some other type of temporary impairment. For example, if a user is sleep deprived he may have working memory issues. His keyboarding skills may be affected, and he may take longer to accomplish a task. However, the ultimate work product may reach his normal skill level—therefore demonstrating his "core" self. For instance, if his cognitive processing time and cognitive rhythms do not match his normal metrics, but the decisions he ultimately reaches and the preferences he normally demonstrates make his response accurate.

Cognitive function refers to a person's ability to process information (i.e. to think), and is reflective of his general level of cognitive skills, as well as his ability to exercise those skills at a given point in time. The user's cognitive/behavioral fingerprint reveals the unique way each person processes the information he encounters in the real world. This processing method can be observed through his unique patterns of interaction with the technological devices he uses each day. These interactions can be measured and analyzed in real time (i.e. dynamic), or after the fact through the digital evidence left behind. A user's cognitive fingerprint is inexorably tied to his cognitive function. Accordingly, a user's highest level of cognitive function is limited by the level of cognitive skills he possesses, and to a great degree, his working/short term memory.

A successful identity management system should also include the ability to recognize a person in multiple and distinct ways. One way to identify a specific individual is to know what that person's capabilities and limitations are—a system that has the ability to recognize him by what he is, as well as what he is not. While an intruder may only provide the chance to capture metrics a couple of times, the computer system may have captured the authorized user's metrics hundreds of times. Therefore it is quite possible to distinguish an intruder from the authorized user, not by knowing who the intruder is, but by thoroughly knowing who the authorized user is—and isn't. For example, when it appears an authorized user's skill level is clearly different than the skill level of the person (or other would be intruder) attempting to gain access to the computer system using his credentials. This can be particularly noticeable when verbal reasoning skills are demonstrated or when fine motor skills are involved. Metaphorical questions are particularly demonstrative in this regard, because an individual's knowledge of the language is critical, and a metaphor can be reflective of local jargon only, for example. In addition, a person is only capable of performing motor skills up to a certain skill level, and that exact level would be hard for an intruder to know or duplicate.

A computer system that can recognize this type of situation can potentially identify an intruder by recording evidence at the time a crime is being committed. This evidence can be used to establish a profile for the intruder that when combined with an unknown shared profiling secret(s), and the user's unique cognitive fingerprint, could eventually lead to the identification of a specific individual as the intruder. This process would make an "insider" such as a co-worker for example, readily identifiable.

For years now, psychologists have been working in collaboration with law enforcement agencies to integrate psychological science into criminal profiling. The most popular method of criminal profiling, offender profiling, attempts to identify criminals based upon an analysis of their behavior while they engage in a crime. If decision making and behavior is common across crimes, it could possibly be the same criminal. Behavior is revealed by the choices offenders make while committing a crime, including modus operandi, location of the crime, and weapon of choice. This information is then combined with other pieces of physical evidence such as a biometric fingerprint, if available. If no biometric fingerprint or actual DNA is available, the behavior can be compared with the characteristics of known personality types and mental abnormalities to develop a practical working description of an offender. Knowing a criminal's patterns of decision making and other character traits can be important, even if they do not apply to a specific criminal act, for instance knowing a suspect's risk taking habits in general.

Cyber crime significantly changes the rules of criminal investigation. First, there may well be multiple crime scenes involved, for instance, the hacker's computing device and where it is located at the time of the crime, and the user's computing device and where it is located at that time; or even where a digital signal may have been intercepted. These locations may be hard to identify, and may include both real world and virtual locations. Unlike traditional crime scenes however, evidence often exists in the cyber world only in a computer or other computing device, a system or network, or on the internet. That is because the weapon of choice is also a computer/computing device, a network, or the internet. Digital forensics is the uncovering and examination of evidence located on all things electronic with digital storage, including computers, cell phones, and networks. Evidence is hard to obtain and easily contaminated, and/or destroyed. While log and audit trails could lead security analysts to a perpetrator, most often the trail ends at a computer, a server, or a network—not the actual person involved. It may never be possible to confront the intruder in person for interrogation. Rarely will a biometric fingerprint or DNA be available and usable as evidence of a cybercrime. With luck, there will be some digital evidence to use, and if the evidence can be attributed to a specific person through the recognition of his cognitive fingerprint and the utilization of continuous authentication, then some real tangible evidence exists.

Modern crime often leaves an electronic trail. Finding and preserving that evidence requires careful methods as well as technical skill. Information on a computer system can be changed without a trace, the scale of the data that must be analyzed is vast, and the variety of data types is enormous. A digital investigator must be able to make sense of any data that may be found on any device anywhere on the planet—a very difficult proposition. The invention disclosed herein, creates the ability to obtain evidence and put together a profile of the intruder from a real world and/or a virtual crime scene, as well as the opportunity to learn important things about the intruder while he is committing the crime, using a four level process. If enough interaction occurs, it may even allow the intruder's unique cognitive fingerprint to be captured.

The invention levels the playing field somewhat between a real world crime and a crime taking place in cyberspace. In fact, there could be more total evidence collected in a computer crime situation than in a real world crime because of the number of devices, systems, and networks involved, all of which have their own means of identification built into them. A criminal attempting to minimize forensic evidence must understand the devices that will be involved in a crime ahead of time, and anticipate the trail of evidence that will be left while using those devices. If the user's cognitive/behavioral fingerprint is to serve as evidence, it must have a reliability factor equivalent to a biometric fingerprint obtained in the real world. Currently less than 5.0% of cyber criminals are caught and prosecuted. Cyber criminals rely on the anonymous nature of the internet and technology to camouflage their true identities. So, it will take other methods to identify and locate them. That is why the use of criminal profiling will almost certainly grow over time.

Criminal profiling involves linking criminal cases based on the crime scenes, the crime victims, and the criminal's behavior during a crime to create a "signature"—a behavior pattern that fulfills a physical or psychological need in the perpetrator. Profiling provides investigators with specific information about unknown suspects that will help in the identification and/or apprehension of the actual criminal. It also helps the investigators reduce the number of suspects by eliminating those who are outside the profile. The more advanced an offender, generally the less evidence of the crime he will leave behind. But, his level and method of attack would probably be the same. In many cases computers contain evidence of a crime that took place in the real world. The computer may only be incidental. Other digital forensics cases are those in which the crime was inherently one involving computer systems, such as hacking. Digital forensics is powerful because computer systems are windows into the past. Many retain vast quantities of information—either intentionally in the form of log files and archives, or inadvertently, as a result of software that does not cleanly erase memory and files. Such records can reveal an individual's state of mind or intent at the time a crime was committed.

Profiling methods evaluate multiple factors including (1) forensic analysis designed to find the meaning of any evidence or other digital artifacts left behind, (2) an assessment of the victim—how, when, where, and why a particular victim was chosen, (3) crime scene investigation to determine distinguishing characteristics, and (4) analysis of the offender's revealed characteristics and traits. Once a suspect has been identified, interactions between the victim and the criminal may be evaluated and include; (A) interpersonal relationships, (B) significance of the time and place of the crime, (C) criminal characteristics of the offender's traits, (D) the offender's criminal history, and (E) forensic awareness—whether the criminal has knowledge of police evidence collecting techniques and procedure, as well as awareness of the evidence that will be left by the various technological devices utilized in the crime. Profiling may be the most relevant in situations where intense relatively short-lived, and potentially traumatic interactions take place, that are generally characterized by the diametrically opposed interests of the offender and the victim. Therefore the influence of situational factors and the role of the victim should not be neglected. Focusing on the types of interpersonal interactions taking place across situations has also proven productive. In the digital age, visiting another person's social networking site and leaving a comment, could be considered by some to be an interpersonal interaction. Researchers in a recently published study in predictive technology, "Private traits and attributes are predictable from digital records of human behavior" (Cambridge University in the UK, and Microsoft Research, 2013), claim that they were able to use easily accessible digital records of behavior, Facebook "likes", to accurately predict a wide range of attributes that included sexual orientation, ethnicity, religious and political views, personality traits, intelligence, happiness, use of addictive substances, parental separation, age and gender. An individual's digital fingerprints, especially those connected with social media and networking, create many new profiling and person identification opportunities. The invention disclosed herein creates the opportunity to identify the person to whom the digital fingerprint belongs—the ability to attach a name and face to the fingerprint.

Biometrics involves identifying someone by his physical, cognitive, and/or behavioral characteristics, and there are advantages and disadvantages to using this identification method for authentication purposes. While a person can imitate another for a certain amount of time, shaking the deeper patterns that are all their own can be difficult. Deeper patterns, such as how long a person might take to solve a certain problem or mental exercise, or how they interpret certain words, or how they demonstrate a preference in a response are embedded in the person's cognitive function and thinking patterns and therefore can be hard to mask.

Being able to recognize these deeper thinking patterns, means cognitive biometrics can also have advantages when it comes to identifying a person who does not wish to be identified. Cognitive biometrics opens new windows on the mind, and new opportunities to profile and identify criminals in cyberspace. It also opens up new opportunities for online credentialing. If identity management systems no longer rely only on proxies to recognize a user, but also focus on user attributes, authentication credentials could have a more permanent recognizable connection to the user as he moves from one device, machine, system, or network to another—credentials that are always in his possession and controlled by him, and that are not just arbitrarily assigned authentication credentials which in essence are simply more proxies for the user. Biometrics has a defined role within the NSTIC trusted credential initiative, and can provide assurance at the highest level. Authentication systems based on the continuous monitoring of the user's typing metrics, directly ties the user's cognitive/behavioral biometrics to his authentication credentials, for example. By transforming his accurate responses (i.e. his keystrokes) into authentication credentials on a continuous basis, authentication can be carried out without interrupting the user's normal activities. The same concept could be used to formulate the basis for a new type of trusted derived credentials for mobile devices, and could be used for multi-factor authentication. A user's accurate responses (the same responses that ultimately comprise his unique cognitive fingerprint, and are therefore always in his "possession" and under his "control" no matter what mobile computing device he is using) could be his logon/authentication credentials, or at least serve as a basis for the logon credentials assigned, and then they could be encrypted strongly. An intruder could then be tracked across devices, machines, networks, and systems without being aware of it, because his real metrics, cognitive fingerprint, and cognitive function will have been captured prior to the time any encrypted logon credentials are assigned to him as he moves from system to system.

Of all the world's creatures, only humans are capable of thinking about thinking, and learning about learning. These represent two of the highest cognitive processes mankind possesses. Much of the thinking and learning concerns how a person's brain perceives the world and processes information utilizing "cognition", which can be defined as "the application of thought to knowing to create new knowledge". However, current research shows that the brain is capable of unconsciously learning as well. The dividing line between the unconscious and the alert conscious brain when it comes to thinking, reasoning, learning, and remembering, is unclear at this point in time. Implicit learning takes advantage of the fact that a person's brain learns and records some things without the person knowing he has learned and recorded them. It refers to developing a thinking pattern, without any conscious knowledge of the learned pattern. This also means that users are usually not even aware they are demonstrating certain patterns or preferences when they answer questions or do mental exercises, and therefore do not specifically try to remember them. Keyboarding takes advantage of this, as it would probably take quite a while to recreate the layout of your keyboard exactly—but you can type quickly and without hesitation. Similarly, it might be possible for a user to "know" a password without being able to write or recite it exactly. As far as multi-factor authentication is concerned, matching an unknown shared profiling secret means the user must be able to match "what the user has", "what the user knows", and "what the user is". A "one-time password" and a token, if applicable, would represent "what the user knows" and "what the user has".

The invention disclosed herein creates an unknown shared profiling secret, or a series of unknown shared profiling secrets between a potential user (or an intruder posing as an authorized user) and the computer system, without the user consciously knowing that is taking place. This is accomplished by presenting the intruder with outside variables (i.e. stimulus-response scenarios), that call for responses that represent his thinking patterns, cognitive function, and cognitive skills, and that reveal certain demonstrated preferences as well. This means an identity management system could potentially be created that is based on what a user really knows, but may not consciously know or remember. For example, how long it takes him to read, interpret, think about, and enter a response to a metaphorical question involving verbal and computational skills calling for several demonstrated preferences. If a response(s) to an exact or similar stimulus-response scenario(s) has been measured and recorded previously, the computer system will have documented this information. A person in his normal cognitive state would demonstrate his normal reading speed, thinking time, and response time in making his response, whether or not he knows what those exact times are or not. Therefore, just by demonstrating the same reading speed he normally does, he might be able to make an accurate response to an unknown shared profiling secret—it is something he knows, but may not consciously know. The user would theoretically not know an unknown shared profiling secret was being created at the time he demonstrates preferences, and therefore would not be trying to duplicate, or avoid duplicating them a second time.

An unknown shared profiling secret comprising a measurable stimulus-response scenario that has been set up ahead of time could be presented. This variable could be based upon previous responses made by an intruder to a key outside logon variable(s) or regular outside variable(s); or even the acceptance response(s) that have been made previously by the intruder. Or an unknown shared profiling secret could be created by recognizing a scenario that has already taken place, which has been recorded in some way—for example the intruder's awareness of the evidence that would be left behind by the various technological devices used in the crime. The design of the unknown shared profiling secret depends on the specific metrics being looked for. The unknown shared profiling secret would be formulated based on previous demonstrations of a user's deep thinking patterns without the user being aware that he has made these demonstrations. An additional unknown shared profiling secret that calls for the same type of patterns to be revealed could then be presented later and the response compared to the demonstrated preferences and other neural coding and decoding information previously collected. Only a person demonstrating these same deep thinking patterns and interactions with the computer could reveal this unknown shared profiling secret exactly—information which neither the authorized user nor the potential intruder may be consciously be aware of. As a matter of fact, it would take a conscious effort on behalf of the intruder to disguise his real deep thinking pattern. If he is posing as an authorized user, he would have to satisfy an identity management system that is attempting to recognize that user. It has been said that a person is really a combination of three people: who he thinks he is (i.e. his "conscious self"), who others think he is (i.e. his persona/personality), and who he really is (which includes his "unconscious" self). The most basic level of trust relates to an individual's true identity. The methods disclosed herein could not be utilized in an identity management system based only on proxies for the user.

In order for a profile relating to the guilt of a specific defendant to be legally relevant, it must render the facts at issue (the commission of the crime by the defendant) more probable. Thus, it is not sufficient to state that the defendant possesses the qualities of the type of individual who could have committed the offense, because the jury must evaluate whether the defendant matching the description is in fact the offender. "There is all the difference in the world between evidence proving that the accused is a bad man, and proving that he is "the" bad man"—Lord Sumner (1918). Profiling has some inherent problems, and one of these is that it would normally be improbable that a profiler would be able to demonstrate with sufficient strength any claim that he or she can reliably and consistently identify character traits (whether personal, social, or cultural) from the crime scenes. That evidence would normally lack any reliable foundation. The four level process disclosed herein (particularly the unknown shared profiling secret and cognitive fingerprint features of it), can overcome this objection by recording responses made by the actual intruder at the crime scene, therefore providing a reliable foundation for identifying some of his character traits while the crime is taking place. Profiling is not generally designed to identify a specific person as the offender, but to help investigators limit the number of potential suspects by specifying the type of personality traits an offender most likely possesses. The word "likely" is important. Profilers tend to talk in terms of probabilities rather than absolutes.

The four level process disclosed herein, is designed to identify a specific person as the offender, and thusly goes much farther than profiling normally goes. The invention disclosed herein, creates new profiling and person identification capabilities through its ability to generate evidence that would not otherwise have been created, or exist. Creating such evidence could be compared to the police using speed detection and alcohol—testing instruments to substantiate speeding and DUI charges. This doesn't mean creating incriminating evidence where there is none—but rather creating the means to generate and collect incriminating evidence that would not otherwise have been created or exist. Each stimulus-response scenario that creates the presentation of an outside variable is really part of a larger overall stimulus-response process to gather additional digital artifacts and forensics—and introduces a new analytical tool, the cognitive fingerprint grid. The "outside response" to an "outside variable" provides the missing link that ties the digital forensic process together. By presenting false logon credentials and/or making an outside response following presentation of the legal/privacy page, an intruder is demonstrating criminal intent.

For instance, the evidence collected in a specific crime could include locating a mobile device indicating a mobile phone call was made near the time a crime was committed. The device may also provide its location at the time that call was made (which may even be part of the crime scene), and/or that may specifically identify another device or mobile phone contacted. Some texting may also have been recorded. However, none of these things necessarily identify the actual parties involved in the crime. That's a major reason why wiretapping, eavesdropping, data mining that looks for conversations and communications, videotaping, and speed detection and alcohol-testing devices may be legally implemented and potentially used to create/generate evidence of a crime. Today, an innocent bystander can create evidence of a crime through his mobile phone or video camera, sometimes even multiple crimes attributable to more than one individual at the same crime scene. Some courts have allowed the police to confiscate the devices involved in such occurrences, if the police believe they need to do so in order to keep potential evidence from being destroyed.

All the afore mentioned methods/devices, if they meet rigid legal requirements, can be used to create and collect usable electronic/digital evidence, and almost all of them have another thing in common—they can be used to create and collect such self incriminating evidence without the individual knowing it or having given his prior approval. Suspects doing what they were going to do, but caught in what they thought would be undocumented actions. The use of the stimulus-response scenario outlined herein, provides a suspect's voluntary response to an unknown shared profiling secret (which could actually be considered a conversation between identifiable parties) from the crime scene, at the time the crime is actually being committed. This evidence is possible only because of the components joined together to form the four level process outlined herein—components not normally found together otherwise; similar in concept to the speed detection and alcohol-testing devices used by the police.

Components include a specifically designed stimulus-response scenario, an unknown shared profiling secret requiring cognitive biometrics (not a proxy for the user, but what the user himself "is"), which allows for outside responses to be measured and recorded. The accurate responses are then transformed into outside credentials that are stored in a memory system that can be easily accessed using a range of different criteria (the artificial intelligence utilized is similar in concept to a DNA molecule), which can then be traced to a specific individual using the cognitive fingerprint grid and cognitive fingerprint analysis. In prior days, evidence of a crime was collected and analyzed with the hope that it could be tied to a specific individual through criminal profiling and the further collection of evidence. The invention disclosed herein, creates the opportunity for a computer system, and an intruder into that system, to jointly create usable evidence that can be tied directly to the intruder during the time the intruder is committing a crime, by utilizing a dynamic four level process.

As far as reliable physical evidence is concerned, being able to recognize the user's unique cognitive biometric fingerprint could be considered tantamount to possessing a biometric fingerprint in the real world ("What the intruder is"). Additional evidence could also include an accurate response to an unknown shared profiling secret that only the same person could make ("What the intruder has, is, and knows"). There would also be evidence of the intruder's cognitive function and patterns of behavior during the crime. The authorized user's normal response to a similar unknown shared profiling secret has already been recorded by the identity management system. The intruder's responses could now also have been recorded. A comparison can be made.

Having this evidence has to be helpful when considering a suspect. There is a good chance (i.e. a strong probability) that a serious suspect for a crime based on other evidence, who interacts with the computer in the same way, demonstrates the same thinking patterns and preferences when making a response to a similar outside variable (a user is not normally consciously aware he has displayed these preferences), has the same cognitive strengths and weaknesses, and exhibits the same decision making skills as the intruder, is in fact, the intruder. Each additional piece of evidence raises the mathematical probability of identifying the actual intruder. Obtaining further evidence of the intruder's true metrics after he becomes a suspect is critical, but can be problematic for a number of reasons, including potentially violating an individual's civil rights and protections regarding self incrimination. Further, a suspect could attempt to disguise his real keyboarding skills when asked to give a sample. Capturing a wide range of metrics at the time of the criminal act that can be measured and analyzed would be a way of creating the opportunity to identify some deeper thinking patterns that make a user unique and reflect his "core" self. These patterns can be consciously disguised by an intruder, but not indefinitely. In 1993, the US Supreme Court held in the matter of Daubert vs Merrell Dow Pharmaceutical that any scientific testimony presented in a court must be based on a theory that is testable, that has been scrutinized and found favorable by the scientific community, that has a known or potential error rate, and that is generally accepted.

SUMMARY

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The invention requires an intruder to respond to a set of one or more outside variables that serve as the basis for a cognitive/behavioral biometric stimulus-response protocol. As used herein, the term "outside variable" means a question (that may be metaphorical in nature), a mental exercise, or other type of interaction that involves a stimulus-response scenario between the computer and a user/intruder that, (a) can be recorded, measured, and analyzed, (b) is selected by the computer and is unknown to and undeterminable in detail by the intruder until the process is over, (c) requires cognition (either consciously or unconsciously) in order to accurately respond, and (d) that may require the use of motor skills beyond a simple multiple-choice response. Examples of outside variables include fill-in-the-blank, short answer, or other questions or exercises measuring the user's verbal reasoning, quantitative reasoning, visual reasoning, long term and/or short-term memory (working memory) skills. Outside logon variables may include, more specifically, vocabulary, comprehension, pattern analysis, matrices, number series, equation-building, and may include other questions or exercises similar to those found in other standardized intelligence tests.

As further described herein, the invention requires the intruder to respond to a set of one or more specifically designed outside variables, the responses to which can be recorded and used to establish a cognitive performance baseline, and which may be used further to establish a criminal profile. In addition, subsequent outside variables may be presented at random, regular, or user-initiated intervals during an active log on session. Through the intruder's collected responses to the outside variables and associated data output, the computer may eventually be able to identify his unique cognitive fingerprint. Outside variables may be presented more than once to the same user, but the data is never integrated with other data that is stored with data relating to the regular cognitive logon process. A user can never achieve further computer system access through the presentation of outside variables that are part of the distinct voluntary authentication/identity management system, or through the creation of outside credentials.

BRIEF DESCRIPTION OF THE DRAWINGS

The invention's features, aspects, and useful effects will be more apparent with the description of the advantageous embodiments and the illustrations in conjunction with the attached drawings, of which:

FIGS. 1A, 1B, 1C, and 1D are partial views that collectively constitute a flow diagram representing the important steps and processes of the most obvious embodiment of the invention, illustrated by way of example and not limitation.

FIG. 2 is a view of the cognitive function/cognitive fingerprint grid that facilitates the identification of an intruder, and that may be used to indicate whether or not the user is cognitively impaired.

DETAILED DESCRIPTION

Figure 1C:
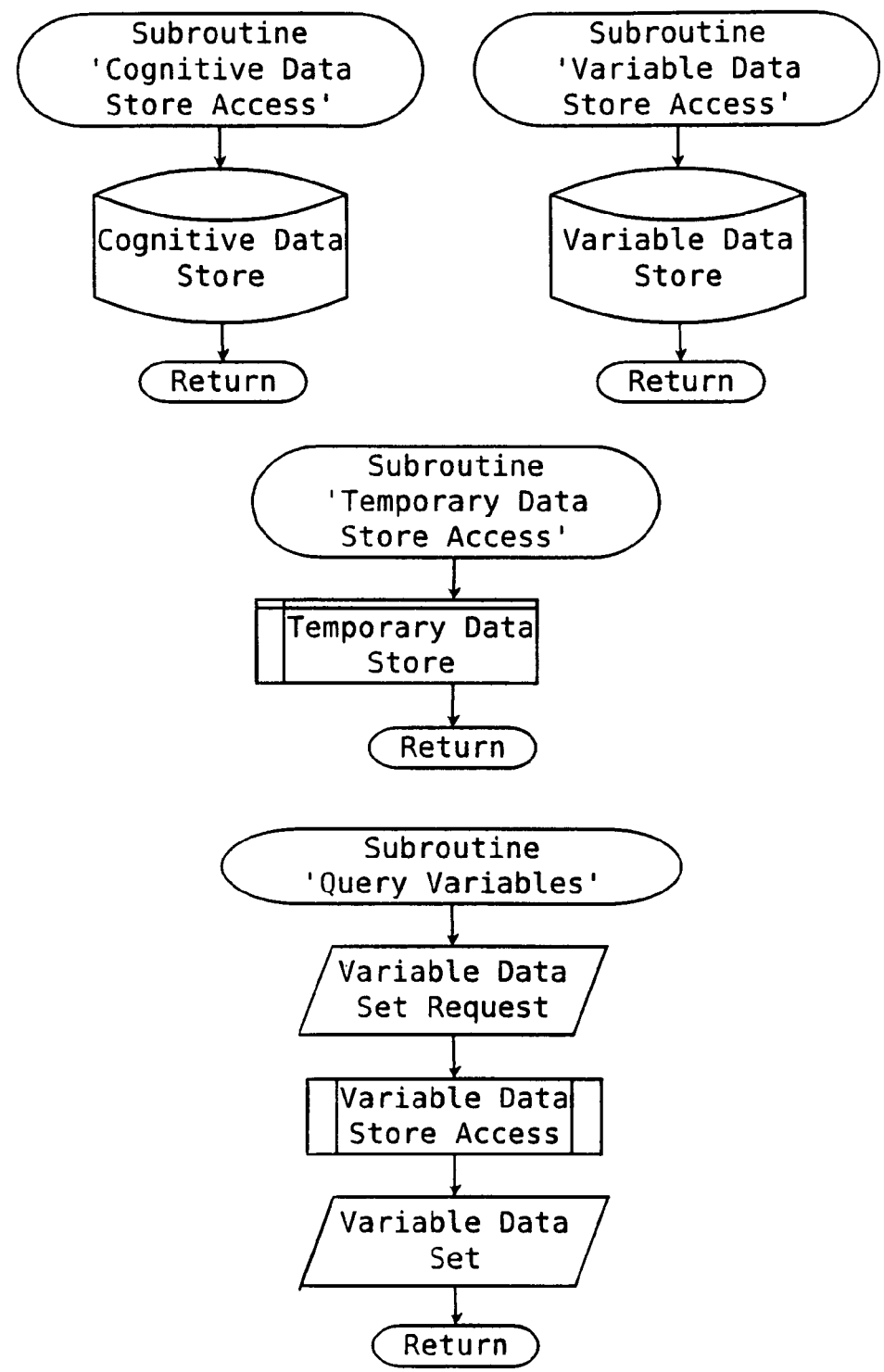

Objects, technical solutions, and advantages of the invention will be easily understood by reference to the following description of embodiments when read in conjunction with the accompanying drawings.

The following terms are necessary to further understand these embodiments:

"Accurate" means an exactly correct response or a response deviating only slightly or within acceptable limits from the exactly correct response (or, if there are multiple exactly correct responses, then one such response), or any response given depending on which stage of the identification process it is applicable to. In other words, it means the accurate, correct, or acceptable response to an outside cognitive variable. The level of accuracy required to create a credential may change as the profiling and identification process continues in order to strengthen the evidence available. Variables are designed to be evaluated in broad general terms (e.g., a math variable) and then evaluated in more detail through another process that breaks down the variable by the cognitive skills needed to answer that variable, allowing for the measurement of a broad range of cognitive skills that include, for example, reasoning, decision making, symbolic thinking, problem solving, judgment, and/or attention. A response can be technically correct, but not the preferred response to an outside cognitive variable.

"Associated information" means information associated with a specific user/potential intruder and/or a specific outside variable, including information that may have been imported from another database, data derived from the presentation of that variable to the user, data derived and associated with the resulting response made to that variable, and/or data relating to the credentials created, the user's historical data from the baseline database (including information that may have been imported from another database that may be located outside the component), the employer's authentication/authorization criteria, and/or data derived from the four level process relating to the current logon attempt.

"Cognitive Grid" means the cognitive function/cognitive fingerprint grid that can be used to identify an authorized user by plotting his cognitive/behavioral biometric fingerprint, to distinguish him from other authorized users and from an intruder by plotting his cognitive fingerprint in comparison to theirs, to reach an absolute decision as to whether an intruder is involved or calculate probabilities that he is or isn't the intruder, and to potentially identify a user who is cognitively impaired. Biometrics that have been measured before can be plotted (e.g. keyboarding skills), and new categories of measureable biometrics can be established, measured, and plotted (e.g. technological savvy), as can biometrics that could potentially be measured/validated if an intruder is caught (e.g. prior criminal behavior). The grid can also be used to plot all kinds of analytics. Things like the intruder's relationship to the authorized user and/or the computer system/computer system's sponsor can also be plotted on the grid.

"Data output" means data collected from the current logon attempt, including the number of outside credentials created, data relating to the four level processing, and any other associated information and/or data that might be developed and used during the process and/or which may be sent for storage in a target storage area following completion of the process.

"Fingerprint screen", "Cognitive fingerprint screen" or "Fingerprint page or webpage", or "Cognitive fingerprint page or webpage" means a specially enabled screen or webpage designed to display the response a user has entered on a keyboard, virtual keyboard, or other input device, and to capture and measure the metrics of the response for unknown shared profiling secret, cognitive fingerprint, criminal profiling, and person identification purposes; or it can also mean a screen or webpage primarily designed and used for other purposes, that can be modified and used to accomplish these same purposes.

"Four level process" means the process disclosed herein comprised of presenting a measurable stimulus-response scenario to the user, receiving input from the user in the form of a response, determining the accuracy of that response, transforming accurate responses into outside credentials, generating output, and storing output which may be retrieved later and used for profiling and person identification purposes, and that allows for the validation, evaluation and monitoring of the user's cognitive skills. The actual process used in a given situation will depend on the willingness of an intruder to respond to the outside variables presented. Therefore it may include all levels, some levels, or portions of some or all these levels, which do not have to be presented in numerical order, and ultimately remains significantly under a user's/intruder's control.

"Intruder" or "Potential intruder" means a person or entity that has gained a threshold level of unauthorized access to a computer system by posing as an authorized user, or by hijacking an ongoing logon session in some way. A person is automatically deemed to be an intruder if he tries to gain access by presenting stolen or invalid credentials and/or he demonstrates a set of metrics that exceed the cognitive or behavioral abilities of the user to whom the original logon credentials belong. For instance, exhibiting keyboarding skills that exceed the abilities of the legitimate user to whom the credentials belong, or reading and solving a problem quicker than the authorized user could. This scenario can be recognized by plotting the response on the cognitive function/cognitive fingerprint grid. Until an intruder has been specifically identified as an intruder, or for that matter "the authorized user to whom the credentials belong", it may be that he is the authorized user with some type of cognitive impairment. Because an authorized user can also be an unauthorized intruder by posing as another authorized user, the terms "intruder", "potential intruder", "authorized user", and "user" can be referred to interchangeably, and the reference should be considered within the context presented.

"Key outside variable" means an outside variable that that may be presented more than once to the user, with or without slight modifications, that is critical to building the baseline data for unknown shared profiling secret, criminal profiling, and person identification purposes.

"Key outside variable response" means a response to a key outside variable.

"Outside credential" means the credential created by making an accurate outside response to an outside variable, and is instrumental in criminal profiling, person identification, and for unknown shared profiling secret purposes. An outside credential can be the actual response itself.

"Outside response" means a response to an outside variable.

"Outside variable" has the meaning set forth in the Summary.

"Unknown shared profiling secret" means an unknown shared profiling secret between the user/intruder and the computer system that (a) is comprised of (i) outside variables that are unknown in detail to the user at the time of obtaining access to the system, (ii) the accurate responses to the outside variables that will be used to create the outside credentials, and (iii) data that will be derived from evaluating the user's responses and other associated data, and (b) which can be used to recognize and/or identify a user beyond those authentication credentials already provided, if any. An unknown shared secret profiling secret could involve a one-time password (OTP) scenario. A useful unknown shared profiling secret will be one that creates a stimulus-response scenario that if presented more than once, results in a high probability that the scenario involves the same parties.

"Variable" normally means an outside variable or key outside variable obtained from a database, but can also apply to parts of the text used on a fingerprint screen or webpage such as the acceptance statement on the special legal and privacy page that normally begins a cognitive logon process, and which initiates the neural coding and decoding measurements that can detect a potential intruder that begins at STEP 9.

"Virtual cognitive interview/interrogation" refers to an applicable part(s) of the four level process, and the associated data obtained from that process, that is used for criminal profiling and person identification purposes. This invention provides the opportunity to collect evidence and establish a criminal profile from a virtual crime scene, as well as the opportunity to conduct a virtual cognitive interview/interrogation with an intruder at the virtual crime scene during the commission of a crime, by obtaining a written statement(s) from the intruder in the form of a response to an outside variable. These factors may eventually lead to obtaining the intruder's unique cognitive fingerprint, and the ability to identify the actual intruder.

Figure 1D:
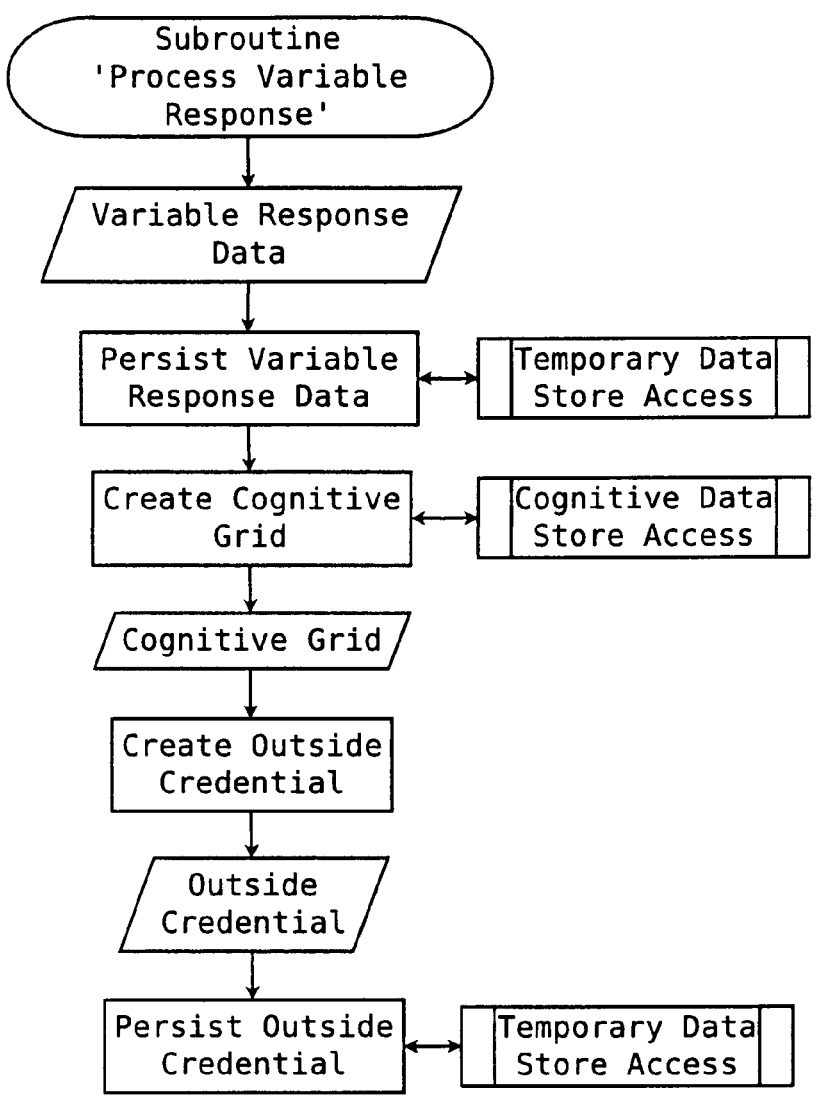

FIGS. 1A, 1B, 1C, and 1D

In the most obvious embodiment of the invention, an authorized user (or a potential intruder posing as an authorized user) requests a logon session by entering a username and password which usually comprise the known shared secret between the user and the computer system into the computer at STEP 1.

Once the regular authentication process is completed (through the standard username/password combination and/or through alternative or additional steps, if required by the system), the user begins the system's normal cognitive biometric authentication process at STEP 2. Such a process may involve presenting a variable or set of variables to the user at STEP 3, recording the user's response to the variable or variables at STEP 4, and if the response is determined to be accurate at STEP 5, the user is successfully authenticated at STEP 6. If the user fails the system's normal cognitive biometric authentication process under suspicious circumstances, has tried to access the system with fraudulent or stolen credentials, is deemed to be unrecognizable or impaired, or fails continuous authentication at some later point during a logon session at STEP 24 and STEP 25, the software component described herein as the invention, is, or can be, initiated at STEP 7. The four level process forms the basis for a distinct authentication/identity management system that begins at Step 7, which can be used to recognize, profile, and potentially identify an intruder. A fingerprint screen or webpage built at Step 8 is presented to the user at STEP 9, such as a legal/privacy screen which may be similar to the system's normal legal/privacy screen for example, outlining the terms to which the user must agree before gaining further access to the system. A different type of page could be utilized, as long as it provides for the presentation of a variable and for cognitive/behavioral biometrics and the user's response to be captured and measured. An intruder may be recognized by his response to the first measurable stimulus-response scenario—his acceptance response to the legal and privacy terms, or other fingerprint or webpage, if applicable.

The legal and privacy screen, or a different screen or webpage if applicable, is presented at STEP 9 (the page that would or could eventually be re-presented at STEP 13 or at some other time following an inaccurate response), calling for the user to acknowledge that he understands and agrees to the terms of the system's cognitive authentication process. The acceptance response could be considered the first outside variable or key outside variable. When he agrees to the terms by making his acceptance response, he provides his first neural coding and decoding information. To start with, he would have to be able to read the language of the statement, requires general reading and language skills, verbal fluency skills, verbal reasoning skills, attention, concentration, and comprehension—all skills that can be measured. He must then demonstrate his working memory, executive function, and decision making skills. And then he must demonstrate his motor skills. He accomplishes all this by making a response(s) such as "Yes, I understand and agree to the terms of this process", or some other acceptable response in the designated space(s) provided, and then typing his name.

Such a process allows the computer program to capture his keyboarding, mouse metrics, and neural coding and decoding while he is reading the text and making his response(s). Therefore, the acceptance response provides the ability to measure the accuracy of the response itself, as well as the cognitive processing time and cognitive rhythms involved in making the response. The intruder's response can be measured against the authorized user's hundreds of responses, which could immediately distinguish an intruder. The page could literally involve dozens of such metrics that could be used to distinguish an intruder from the authorized user, and be designed to reveal the intruder's "core" self. Therefore, it can be used to test for mental impairment as well. It is important to make each screen and/or webpage presented to the intruder appear as if it is the final authentication requirement so the intruder will continue to participate, unless the system's administrator decides to disclose to the intruder that he has been caught in criminal activity and he should exit the system immediately.

The acceptance response at STEP 9 is then processed, and a comparison may be made to the metrics of other users at STEP 10, after retrieving historical data from the cognitive data store. If the response matches, he is returned to the start of the system's normal authentication process. However, an intruder may not know the accurate acceptance responses previously made by the user, and would not be able to match the neural coding and decoding measurements associated with an accurate acceptance response. If the authentication process cannot recognize the user as the authorized user, the user may be deemed to be a potential intruder, and treated as such. The legal/privacy page (or other page if applicable) built at STEP 12, can be presented a second time at STEP 13, and the response made is captured at STEP 14 and analyzed again, after accessing the cognitive data store. The re-presentation of this page, or other fingerprint page if applicable, may cause the potential intruder to give up trying to gain access to the system, or he may continue. The first acceptance response and the associated data generated become the starting point of building the intruder's criminal profile, and will be compared to the second response for analysis purposes. Both the first and second responses comprise unknown shared profiling secrets between the intruder and the computer system and will be used for profiling purposes. The responses, associated data and information, and any outside credentials that have been formed from the variable response process at STEPS 10 and 14 is sent to temporary storage, and a cognitive grid as outlined in paragraphs [0120-0123] is created reflecting the intruder's metrics collected to this point, that will be used in the four level process.

As part of four level processing, at STEP 17 the potential intruder may then be presented with additional outside variables that he may or may not respond to, thinking he is still involved in the computer system's normal cognitive authentication process. An intruder would not know whether the variable was an outside variable or a variable that continues the regular logon process. He would also not know a variable was designed for profiling and identification purposes. The process will continue until the user stops responding to outside variables, or the program stops presenting them. A maximum time limit may be applied and/or a maximum number of attempts may be set.

If a fairly detailed fingerprint screen or webpage is presented first (particularly if it has multiple acceptance sections), authorized users of the computer system who are familiar with the page will know where the required acceptance statement(s) is located on the page, whereas an intruder would not. Therefore, an authorized user would be able to go straight to the acceptance statement(s) without having to read all the text first, whereas an intruder may have to read all the text to understand what he is being asked to do. If the intruder visits the page a second time, he may read the text over again thinking he has missed something because it is being presented a second time. On the other hand, he may be in a hurry to make a second response and just look for a place to accept. Either way, his metrics have been collected-possibly twice, and a profile may be created. This profile may be supplemented with other data that would normally have been collected by the security systems and devices that are involved; such as where the intruder is located, or what IP address he comes from, what device is involved, etc. A person not familiar with the page when presented with a second acceptance statement opportunity may be able to find where to accept much more quickly, but that would not change his keyboarding abilities. The measure of his total response time can be segregated to allow the separate parts to be measured. All of these logistics can be considered when an employer designs the legal and/or privacy page.

At STEPS 11, 16, and 17, if applicable, further variables may be accessed from the variable data store, which could be self-contained within the computer system, or the system could access a target storage area located outside the computer system. Other associated information could be imported into the variables database from an outside database, such as an employer's database.

If another variable is to be presented at STEP 17, the component analyzes the data accumulated at STEP 15, and based on that analysis, begins selecting outside variables which comprise unknown shared profiling secrets for presentation to the user one at a time, based on a strategy that facilitates the four level process. A standard set of variables could be established by the system's administrator, or the follow up variables could be geared to the responses received on an ongoing basis, until the intruder no longer responds. As long as the intruder is providing responses, this process could involve repeating STEPS 17-20 several times. If the intruder is an authorized user trying to gain access to the system above his normal authorization level, he will have to be posing as another user and he would not be familiar with the normal protocol or the types of variables that are necessary to access a higher level of the system. If he is really trying to access the system, he would continue to respond to the variables. Each variable in the database is tagged with an accurate response and other cognitive data for that variable (i.e., the general classification and the specific cognitive skills to be measured as well as the difficulty level of the variable), thereby determining the outside credentials that may be presented. All of the variables that will be presented to the intruder are still unknown to him.

At this point, STEP 18, the user is presented with the first outside variable that is not determined ahead of time that formulates an unknown shared profiling secret. The neural coding and decoding measurements acquired through the presentation of this variable to the intruder, will be incorporated into the four level process, as will any additional metrics that have been measured. Because both the variables and the accurate responses to these variables are unknown to the user, the user must utilize cognition in order to make a response to the variable, and will demonstrate certain preferences and patterns, and will disclose certain cognitive/behavioral biometrics that can be measured. The user must demonstrate some or all of the following cognitive skills: attention, awareness, comprehension, concentration, decision making, executive function, judgment, logical thinking, long-term memory, perception, problem-solving, planning, math skills, reasoning, short-term memory, symbolic thinking, verbal recognition and verbal memory, and visual-spatial skills.

The following example is used for illustrative purposes: Outside variable (i.e. stimulus-response scenario and unknown shared profiling secret): "Fill in the following spaces with a synonym for the word CAR that has ten letters, begins with the letter 'A', and ends with the letter 'E': _____."

When the intruder has thought up what his response will be, he transforms the thought in his mind into a response by entering it on the device's screen at STEP 18. The neural decoding measurements that will be used in the four level process begin at this point. In this example, the correct response would be AUTOMOBILE. At that exact moment, while the thought of the word AUTOMOBILE is in the user's mind, if only for an instant, the computer system reads and captures that response at STEP 19 and at STEP 20 sends it to storage at STEP 21.

There was no reason for the user/potential intruder to be thinking of the word AUTOMOBILE, as opposed to any other word in his vocabulary, at the moment before the variable was presented. The user had not previously been informed that the word AUTOMOBILE was his username or password or that it would otherwise be required at the time of logon. The user did not know the variable ahead of time and therefore could not have accurately known, predicted, or memorized what the accurate response was going to be. The variable is not a multiple choice question, where the accurate response is presented to the user as one of the options. The word AUTOMOBILE does not appear in the variable or on the computer screen at all prior to the response. The user was probably familiar with the word AUTOMOBILE. Perhaps he already used that word in a sentence that very day, or perhaps he drove his AUTOMOBILE to work. Perhaps his parents referred to a car as an automobile. But he may never have thought of that word in exactly this manner before, and the only reason it was in his mind at the exact moment he made his response was because of the variable presented to him and his utilization of cognition.

The previous illustration demonstrates the cognitive nature of the component. The variable calls for the intruder to exhibit the cognitive skills of verbal fluency—the ability to quickly access your mental vocabulary, phonemic fluency—the ability to bring forth words that begin with a certain letter or sound, and semantic fluency—the fluency of bringing forth words in a certain semantic category. A machine attack would not be able to read or respond to the variable, and would have to know what the word "synonym" means. If there is a question as to whether or not the word AUTOMOBILE is in the user's brain at that exact moment, but not really in his mind, then why did the user respond with that exact word at that exact moment? After all, the user may have had somewhere between 20,000 and 30,000 words in his vocabulary (and therefore in his brain) at that point.

To illustrate further, and to show how a variable can have a range of difficulty levels, consider the different ways the variable used in the previous example could have been presented: "Fill in the spaces with another word for AUTOMOBILE which has three letters: _____." Or, it could be modified to: "Fill in the spaces with a synonym word for AUTOMOBILE that begins with the letter 'C'"; or "Fill in the spaces with another word for AUTOMOBILE that has three letters, begins with the letter 'C', and ends with the letter 'R'"; or, without showing any number of spaces, "What is another word for AUTOMOBILE?" An outside variable could be presented that involves a word that is uncommon or rarely used. This could narrow down the profile of the user by revealing his educational level, native language, etc.

The outside response can be entered into the computing device, which includes mobile computing devices, through a variety of interfaces, including a keyboard, virtual keyboard, or some type of user brain computer interface (including a brain-reading headset), which may be facilitated through the use of a mouse, the metrics of which involve neural encoding and decoding, and can be measured.

Returning to the diagram, the outside response is captured and processed and at STEP 19.

The neural encoding and decoding measurements of how long it takes the intruder to read the variable, think up his response, and enter his response, including mouse metrics if applicable (i.e. response time), create the ability to measure and record encoding and decoding relating to the responses in aggregate, by separate steps, and even by the specific type of skills and sub-skills required to accurately respond, as well as how the user organizes his responses. These measurements in combination reflect the intruder's working memory; a cognitive skill that can be used to distinguish one individual from another and which sets an upper limit on cognitive performance. These neural encoding and decoding measurements can be recorded and classified by the level of difficulty of the variable presented for response. This process provides the opportunity to observe the user in real-time and over a longer period of time based on previously stored data. The link between stimulus and response can be studied from two opposite points of view: the neural encoding map from stimulus to response (i.e., presentation of the variable to initiation of the variable response), and the neural decoding map from response to stimulus (intruder creates and enters a response, which is read by the component). Both perspectives can be measured by linear stimulus-response or other means and allow for measurement by the type of cognitive skills involved, and can then be used for validation, evaluation, and monitoring purposes when integrated into the four level process as an additional means of cognitive/behavioral biometric verification.

The component transforms the outside response (the manifestation of the thoughts of the user) into an outside credential at STEP 19.

Transforming the outside response into an outside credential accomplishes several purposes. First, it provides an easy way to capture associated information relating to the response itself. Second, it facilitates longer-term storage and record-keeping for such information. Third, it can serve as the basis for a derived "trusted" credential. All of the above facilitate the four level process, and create the ability to evaluate neural encoding and decoding and other associated information relating to the stimulus-response scenario (i.e., elapsed time).

By storing the credentials in the computer's memory utilizing an activation-diffusion artificial neural network model, or other similar model, the credentials (and the associated data stored with each credential) can be searched using the connections and relationships that exist between the credentials for pattern recognition purposes; and then searching in a similar manner for connections and relationships that exist between the pertinent credentials and the real life physical evidence, facts, and information that has been collected. For example, as outlined further in the explanation of the four level process, various separate and simultaneous searches can be executed that focus on: (1) the cognitive skills of a party or parties, (2) relationships that exist between parties, (3) revealed characteristics and traits of a party or parties, and (4) criminal behavior, similar crimes, and crime scene considerations. At least two levels of investigation will be occurring at the same time; one using the computer program's virtual/digital techniques, and the other using physical/real world data, information, and evidence; and then the results of the investigations may be combined.

The credential storing process just set out, may also be compared to DNA profiling (i.e. genetic fingerprinting) in the real world, in a number of ways. The stored credentials serve as a means of coded digital storage—similar to a DNA molecule. They facilitate advanced bioinformatics. The biometrics of individual users can be collected through their responses to the outside variables. Other associated information, neural coding and decoding that has been recorded, for example, is stored with the credential as well. Since all this coded information is stored together, using an activation-diffusion artificial neural network model, data mining of the biometrics of a specific user, or type of user, may be undertaken much in the same fashion as his actual DNA could be analyzed in the real world. Evidence stored in this manner, can be combined with other evidence and can be used for double duty for profiling purposes. Further evidence that matches an intruder's so-called "digital" or "cyber" DNA profile (for example, his cognitive function/cognitive fingerprint) can be used to strengthen an existing criminal profile, and other evidence may be used to point away from that profile, and start a second profiling opportunity.

The ability to compare evidence against already existing evidence in the form of previously stored cognitive biometric responses and neural coding and decoding, is a powerful tool. A response to an outside variable can serve as evidence of guilt, or of innocence, like DNA in the real world. Unlike a fingerprint in the real world however, a cognitive fingerprint may be tied to a specific date and time. This digital DNA can be analyzed on the cognitive fingerprint grid.

The computer program presents the user with outside variables that require cognition and are designed to elicit specific responses. Responses are transformed into (and become and formulate) outside credentials. The component can be considered to be reading what is in the user's mind and/or thoughts (i.e., performing further neural decoding) at the time the user makes his response. This includes the steps and processes at STEPS 7-23. In the initial stages of the process, creating outside credentials does not involve or require a meeting of the minds, but may as the process moves to more meaningful stimulus-response scenarios.

Once the above process has been completed for the first outside variable the system makes a decision at STEP 17 as to whether another variable is to be presented, and if so, the type of variable. The variable needs to meet the requirements of the applicable level of the four level process being utilized, and the variable could be pre-set for a particular set of circumstances. This variable is sent for presentation to the user. The process is repeated until the desired number of outside variables has been presented, the user/potential intruder terminates the logon attempt, or the user has been denied access to the system for another reason.

When processing is completed at STEP 23, and all the data, credentials, and associated information is sent to long term storage, a notice of the failed logon attempt may be presented to the user at STEP 22, and notification may be sent to the system administrator regarding the situation at STEP 23.

Today's normal authentication process is highlighted by the fact that authentication involves a known shared secret between the user and the computer system. At least one known shared secret has been presented to the computer system already at STEP 1. The component disclosed herein, introduces a new dimension to the computer logon process that provides the ability to capture the cognitive/behavioral biometric fingerprint of an intruder at the time a crime is being committed, by requiring the intruder, who may be thinking that he is going through the system's normal cognitive biometric authentication process, to make further responses to a number of outside variables. By presenting these stimulus-response scenario(s), the neural coding and decoding of an intruder may be captured before he would normally have been recognized as an intruder, which may not have been until after he gained control of the computer system. Further variables may be used to entice him to give further information about himself before he knows he has been caught, or otherwise leaves. This further information includes creating as many unknown shared profiling secrets as possible that he is not aware of.

By the time the component is initiated at STEP 7, the first unknown shared profiling secret will have been set up between the user and the computer system for presentation at STEP 9. The component utilizes multiple additional unknown shared profiling secrets to accomplish up to a four level analysis process to further profile and identify a potential intruder. The process of providing these additional unknown shared profiling secrets includes the steps and processes at STEPS 7-23.

When the process has been completed at STEP 23, all the unknown shared profiling secret(s) that have been asked and responded to will have been revealed, comprising what the intruder and the component will then know—measured in real-time, which makes the component dynamic in nature, and allows a process that is tantamount to a virtual cognitive interview/interrogation to be conducted while the intrusion is taking place.

The four level process, which culminates at STEP 23, is designed to detect an intruder from the authorized user (or cognitively impaired authorized user), and to gather as much evidence regarding who the intruder is, during the short time an intruder is willing to spend to gain further access to the system. During this time, there is no indication given to the intruder that an alternative identification process is being utilized. Each person has stronger and weaker cognitive skills, and each user thinks in his own way, interacts with the computer/computing device in his own way, and responds to the variables in a different way, even though his responses may all technically be accurate. If after one inaccurate response several responses start to accurately reflect the authorized user's cognitive fingerprint (i.e. the user's cognitive function/mental alertness is improving), the four level multi-factor process could be terminated, and the user could be redirected to the original logon screen allowing him to start the regular cognitive logon process over again, including re-presenting his logon credentials. If it really is the authorized user, maybe he can be successful in a second logon attempt. When taken together, the response analysis process is a four level process, certain levels of that process, or certain portions of specified levels of that process, which when combined with a detailed profile of the victim, other cases describing similar criminal behavior, and a suspect's criminal history can be used to profile and apprehend an intruder. The process which includes a combination of data, information, facts, and evidence collected by and through the technological devices involved, as well as through all other means available. The process works as follows:

Level 1 Processing

In the real world, Level 1 processing would involve capturing and evaluating digital artifacts and other evidence found at the primary crime scene(s)—the crime scene(s) where the most criminal interaction has taken place, as well as the characteristics of the crime scene(s) itself, which could reveal other profiling clues including the underlying personality of the offender. The same applies in the virtual process. Level 1 processing starts with the computing device(s), computer systems and computer networks involved. The crime itself actually begins at the point where the metrics suggesting an intruder are first captured—which will most likely be the acceptance response made on the privacy/legal information page (or other fingerprint screen or fingerprint webpage, if applicable). The acceptance response can be considered to be the first outside variable if the response does not correspond to the response that would be expected from the authorized user to whom that username and password belong. If the response had been accurate, the regular cognitive biometric logon process would simply have continued. The response to such a statement demands cognitive skills that have shown to be particularly vulnerable to alcohol impairment and sleep deprivation such as fine motor skills, executive attention, working memory, and divergent higher cognitive functions. The acceptance statement could be re-presented to the user a second time to see if it is the authorized user, who perhaps is only momentarily impaired. The metrics collected can be compared to the system's records to see if they match another authorized user of the system. The screen could be reformatted to further distinguish between an intruder and an impaired user.

At this point, the computer system will have already captured some basic neural coding and decoding of the intruder because these metrics would have been captured as part of the acceptance response(s) made by the user. The process disclosed herein may ultimately allow the computer system to identify a specific individual by recognizing the intruder's unique cognitive biometric fingerprint. The responses to further outside cognitive variables presented will provide additional profiling and identification capabilities. The acceptance statement also includes a broad array of other cognitive skills that can be measured, including reading and language skills, perception, comprehension, decision making, and reasoning. The intruder will also have revealed some demonstrated preferences. The collection of this information is part of a specific process following four stages: data assimilation, data classification, crime reconstruction, and profile generation.

A preliminary profile can actually be established after this first level of processing. Collecting responses that demonstrate a broad array of skills is important. The acceptance response involves the presentation of at least one unknown shared profiling secret, and sets the stage for creating more unknown shared profiling secrets. If it is determined that it is the authorized user in an impaired state, the administrative rules of the system will govern further actions. The unknown shared profiling secret(s) will be part of the evidence trail, and will be used along with the other evidence and any digital artifacts left behind that have been collected. Forensic awareness should be analyzed from two points of view: knowledge of police evidence collecting techniques, as well as knowledge of the type of evidence that will be left through the technological devices involved in the crime. Significance of time and place is ascertained. Using a continuum that comprises part of the cognitive grid to plot his decision making and behavior patterns, a decision can be made as to whether the attack should be considered organized or unorganized; whether it was planned and rehearsed—or unplanned and impulsive; and/or whether the intrusion seems to be an outright criminal act—theft for example; or an act of excitement, retaliation, or anger designed to inflict pain or anguish.

The goal of Level 1 processing in general, is to obtain knowledge and associated data regarding; the intruder's cognitive skills, the intruder's connections and relationships, the intruder's revealed characteristics and traits, and other various crime/crime scene considerations. The hope is to identify specifically: the logon credentials used by the intruder to gain access to the system, some cognitive/behavioral biometrics of the intruder, whether the metrics captured belong to another authorized user of the system, some demonstrated preferences the user has made in his responses; some basic decision making by the intruder; the digital artifacts left by the intruder; the intruder's English language capabilities; a preliminary idea of whether the potential intruder is really the authorized user who has some type of impairment; the intruder's forensic awareness; the intruder's familiarity with computer systems and computer security; the intruder's keyboarding skills and mouse movement characteristics; the intruder's responses to several unknown shared profiling secrets; some neural coding and decoding measurements of the intruder; whether the crime was organized or unorganized; facets of the intruder's cognitive fingerprint; any relationship of the intruder to the computer system; any relationship of the intruder to the authorized user—and how he came to posses the stolen credentials; and whether there might be other connections of the intruder to the crime scene(s). Although the associated data collected as part of the Level I process is never used for real authentication purposes, it is always maintained in storage.

Level 2 Processing

As in the real world, Level 2 of the four level process involves the process of collecting and analyzing more of the intruder's revealed characteristics and traits (particularly criminal traits), his forensic awareness as it relates to technological devices and cyber security in general, and any direct relationships to the systems he may have. In other words, this level of the process is used to identify another authorized user as the intruder, or to rule out that scenario. This level also includes attempting to make a final determination as to whether an intruder is really involved, or whether it is most likely the authorized user with some type of impairment. Therefore, emphasis will be based on trying to further identify whether impairments such as sleep deprivation or alcohol/drugs are involved. Testing the intruder's working memory, decision making, and reasoning skills works well for this purpose. Demonstrated preferences are important as well, as they will be evidence of the intruder's behavior pattern. A thinking pattern question that involves decision making, reasoning, and demonstrated preferences within a risk based scenario will therefore be asked. Decision making is an inseparable component of all cognitive activities. In studying decision making, it is critical to examine both the processes by which decision alternatives are identified, evaluated, and managed, as well as the actual selecting mechanisms that lead to the decision choice. A life experience question should also be considered.

For illustration purposes, an example of an outside variable that could be presented is: "You are on an ocean cruise, your ship hits an iceberg and starts to sink, and you are on your way to the life boats. You can grab several items from your room to take with you, but you must leave ASAP. What items would you hunt down and grab from the following list, and in what order: life jacket, sweater, coat, important medications, bottled water, food and snacks in your room, hat, gloves, jewelry, wallet, purse, mobile phone, lighter, blanket, change of clothes, souvenirs, airplane tickets home, radio, map, makeup, glasses, a bible, sunglasses, sunscreen, pop, soap, toothbrush, toothpaste, a suitcase, business papers, laptop computer, watch, ship passenger tickets, vault receipt for items in the ship's vault? Remember that an intruder does not know the types of variables that are going to be asked for a specific level of access. If an intruder thinks this question takes too much time or effort, that could be an issue—but it may not really matter. If the intruder goes away, no harm has been done to the system, which is a measure of the strength of an authentication system. If he continues to participate, it may demonstrate a committed criminal, or that it is the authorized user—who may be impaired. If a long question is phrased right, it could call for a series of answers, so if an intruder doesn't choose to "finish" the question important data may have already been collected, and will be kept in storage.

This level of the process would also include trying to capture responses that would continue to reveal the intruder's cognitive fingerprint, but also, and maybe even more importantly capturing responses that further distinguish the intruder from the authorized user. An analysis of the intruder's forensic awareness will become part of his revealed characteristics.

Level 3 Processing

Level 3 processing emphasizes capturing the intruder's deep thinking patterns and identifying his stronger and weaker cognitive skills by collecting further evidence of his decision making skills. Evidence of intruder's decision making skills already exists through the evidence left from his attack on the computer system. In the real world this opportunity may never come, because the intruder may never be identified. Guesses can be made, but that's all they may ever be—just guesses. In the virtual process disclosed herein, if the intruder responds to an outside variable there will be direct evidence comprising a statement from the intruder. Decision making is an inseparable component of all cognitive activities. Level 3 processing also involves further attempts to identify the intruder's individual cognitive fingerprint.

Using an example, it may be advantageous for evidence purposes to capture a demonstration of the user's verbal reasoning skills by presenting an outside variable comprising a conceptual metaphor that involves understanding one idea, or conceptual domain, in terms of another (i.e. utilizing the conceptual metaphor theory), written in English. Such questions and mental exercises require the user to utilize multiple cognitive skills and domains to respond, and measure knowledge existing in several states simultaneously and without contradiction, the accurate responses to which change depending upon who it is that is reading the question or doing the exercise, and that person's perception, cognitive skills, and thinking/decision making patterns, which may be reflected in his demonstrated preferences. Or, the component could present a variable that demands attention, math skills, symbolic thinking, and decision making that tests quantitative reasoning skills. Each outside variable has a cognitive skills tag attached to it that indicates the cognitive skills measured by that variable as well as the difficulty level of that variable.

There are a number of other cognitive skills that can be measured and that will be used to build the cognitive skills baseline data for this specific intruder. This baseline data will provide a point of comparison against the current logon process for profiling and identification purposes, and would, over time, result in the user having revealed his unique cognitive/behavioral biometric fingerprint that can be used for biometric recognition purposes. Each person has stronger and weaker cognitive skills, and each user thinks in his own way, interacts with the computer in his own way, responds to the variables in a different way, and demonstrates different preferences even though his responses may all technically be accurate. His responses indicate more about his unique thinking pattern.

For illustration purposes, a variable could be presented to test the user's general math skills such as: "You are a waiter who owes change back to five customers all of whom have presented a $50.00 bill for the payment of their dinners, with each dinner costing $28.32." The user is instructed to show the five ways he could give back the change he owes the five customers. The response would demonstrate some obvious skills such as attention, perception, working memory, executive function, math, problem solving, symbolic thinking, and decision making skills by determining how much money to return and the exact coins and bills to give back, making sure that the coins and bills given back add up to the correct amount. It would also demonstrate his knowledge of U.S. coins and currency. However, the user's verbal reasoning is also demonstrated by his interpretation of the phrase "show the five ways . . . ". Did the user give back the same type of coins and bills to each customer, or was it paid out a different way to each customer? Did the user pay it out using the most customer-friendly way each time (least amount of bills and coins), or in the most "tip" friendly way—including at least two five dollar bills or a five and five ones instead of two tens or a twenty, anticipating a tip larger than $1.68, but less than $10.00 or $20.00? The variable did not specify whether or not the customer has other money available for a tip, or whether the waiter has all types of coins and bills available.

In the real world, the method used would depend on the change the waiter actually had available. But here it shows the thinking patterns and deep thinking patterns of the person making the response, as well as demonstrating his preferences. These patterns would normally be deep thinking patterns, and therefore could be used to distinguish the authorized user from an intruder by presenting a similar variable to a potential intruder. Deep patterns such as how long it takes him to solve a problem like this are hard to hide. It also reflects the context he exists in, and his real life experiences. For a full time waiter serving good food is important of course, but getting the orders correct, serving them quickly, and keeping people happy is also important. But since he is making his living generating good tips, thinking about the tip ahead of time may be the most important thing on his mind—and in the previous example $1.68 would not be considered to be a good tip. A response that indicates giving change anticipating a tip, as opposed to returning change in the most customer friendly way, might provide an indication of the thinking pattern of the person at the keyboard, as well as a way to distinguish one user from another. A user who had been, or is currently a bank teller, would normally pay the change back in the most customer friendly way.

In other words, all of the responses are correct as long they add up to the correct change, but the way the user would pay it out demonstrates the way he thinks when responding to such a variable, and how he would be expected to respond to a similar variable at some future point in time. This is reflected by his demonstrated preferences. Users are not usually consciously aware they have made these demonstrated preferences, and an intruder certainly would not know the preferences demonstrated by the authorized user he is trying to imitate. Software that uses brain scans to determine what items people are thinking about has already been developed, and the results indicate that "the more detailed the thought is, the more different the brain scan patterns get from one person to another, indicating different people have different associations for an object or idea." S. Begley, "Mind Reading Is Now Possible,"*Newsweek*, Jan. 21, 2008. For example, what a person thinks when the word "dog" is mentioned. Further, "[t]he way that people interact with information is incredibly unique; if you can find a way to capture that, then you can measure someone's identity." D. Dinely, "COGNETO: To Identify and Beyond," *Infoworld*, May 25, 2007.

Studies have shown that measuring some skills in an aggregate sense is not always reliable. For example, it is difficult to measure decision-making skills in the aggregate because there are many factors involved in most decisions—such as responding to the question in paragraph [104], for example. It is nearly impossible to ascertain whether the exact same cognitive skills are required in making two different decisions, and therefore the measurement may be unreliable. It may be necessary to measure each cognitive skill individually rather than the aggregate. By comparing skill levels exhibited during the current logon process to historical baseline data using the cognitive grid, the pattern and consistency of the user's stronger and weaker cognitive skills can be verified.

Level 4 Processing

The fourth level of the process involves attempting to collect more demonstrated preferences and response solving techniques from the intruder, as well as obtaining responses, if any, regarding judgment, reasoning, and decision making within a risk-based context. It also includes a comparison of the data derived from the current logon attempt against the intruder's neural coding and decoding baseline maps created for the four level thus far, to create a further profile of the intruder. If possible, it also involves gathering further evidence of an intruder's cognitive biometric fingerprint.

Reading and verbal skills are primary to solving a cognitive skills variable, because if the intruder cannot read the variable correctly, the user cannot be expected to make a legitimate response. Individuals create their own variable responses in a manner unique to them. Knowing how a user has addressed similar variables (demonstrated preferences and solving techniques) indicates how the user might be expected to respond to a variable or key outside cognitive variable designed to test the same cognitive skills, and to similar variables set up with minor variations using different numbers, colors, shapes, etc. Users are not normally even aware that they have demonstrated these preferences in their responses.

Using a basic example for illustrative purposes: Fill in the blanks on the screen using the following shapes, putting them together in groups (or the word "sets" could be used instead of "groups") of three (the word "set" may mean different things to different people): ◇ △ □ △ ○ △○ □ ○ ◇ □ ◇.

The user's response is: ○ ○ ○ △ △ △ □ □ □ ◇ ◇ ◇.

This format could be used to establish key outside variables for a user, modifying the format by simply changing the order of the same shapes, by changing the kinds of shapes included, by increasing or decreasing the number of different shapes used, or by changing the number of each shape used, which would change the number in each grouping. However, the basic scope and format would remain the same.

Some people that are presented with this exercise will arrange the shapes reading from left to right—others will not. The order in which the user groups the shapes together does not matter, as long as they are arranged in groups of three, the response is correct, and an elapsed-time measurement has been made. However, the order of the grouping tells us something. Does the user always group similar shapes together, and does he arrange the grouping in the order in which the shapes first appear reading from left to right, or in some other way, such as the user's response in this example. The response is also compared to all of the user's previous answers for that same type of variable. Once a significant number of such demonstrated preferences has been made a number of times, those preferences can be used to create a separate baseline, which can then be used along with other data as an additional identification and recognition process. The user's responses demonstrate preferences which the user may not consciously know he has demonstrated.

When applicable levels of the four level process outlined above have been completed, the results are transferred to permanent storage at STEP 21.

When the cognitive stimulus-response and evaluation process has been applied to a intruder causing his cognitive biometric fingerprint to be revealed, and the neural coding and decoding has been successfully mapped, the four level process is demonstrating machine learning (i.e. artificial intelligence) by automatically learning to recognize complex patterns and make intelligent decisions based on data contained in the database and evolve behaviors based on empirical data. For example, whether or not to present further variables to test for sleep deprivation or another impairment. Because of the cognitive nature of the component and the four level process, the component allows insight into the intruder's brain processes.

The intruder and the software program product can both be considered to be exercising thought-directed control, as the component determines the outside cognitive variables to be presented, and the user must create the thought in his mind that initiates the response which is transformed into the outside credential for that specific variable. Neither the component nor the user can unilaterally create an outside credential. This includes the steps and processes at STEPS 7-20.

The component can be considered to be a thought-directed user interface, involving self-checking and self-completing software, the outcome of which is totally dependent upon the user's responses to a set of computer-selected cognitive variables that represent the manifestations of the user's thoughts. This includes the steps and processes at STEPS 7-25.

By its execution, the four level process provides an additional layer of security to the computer system, thereby making the computer less vulnerable to hacking or other unauthenticated and unauthorized access by would-be intruders who may be attempting to compromise the computer system and/or achieve identity theft. The process can also be used for criminal profiling to identify a specific person who has attempted to gain unauthorized access to an IT system by posing as an authorized user.

Another embodiment of the invention is designed to address an intrusion and/or hijacking attempt that is made during an active logon session, for example, where an authorized user has left his work area for a short period of time. If an intruder does not pass the next round of continuous authentication testing, he is sent back to start the logon process all over again. However, the intruder's metrics may have been captured as part of the continuous authentication process, and could now be used to identify him. It is therefore quite likely that an "insider" can be caught in the act and readily identified through the use of the cognitive grid, because the system already has his metrics on file to use for matching purposes. FIG. 2

FIG. 2 illustrates the cognitive grid; an X and Y axis grid that creates four quadrants that can be used to measure how the metrics of the current logon attempt, for instance reading speed, compare to the authorized user's recoded metrics from prior logon attempts. If a user fails the authentication process, this grid can be used to determine how close the previously recorded metrics match, and whether or not those metrics can actually be attributed to him. The cognitive grid creates the ability to leverage an identity management system to be able to recognize an intruder immediately. Normally, there will be more initial evidence of an intruder's identity if he is posing as another user to gain access to a computer system, than if he has hijacked an active logon session to gain access to a computer system, but not necessarily. Being able to initially plot the metrics of the intruder against those of the authorized user he is posing as, by comparing the exact metric(s) that are different between the two, accommodates a quick search; and if the initial search is made for multiple metrics, can possibly identify an impaired user more quickly in situations where the authorized user is only partially or temporarily impaired. The same will be true when an insider who hijacks an existing logon session fails the continuous authentication process. The grid can be used to analyze a user's so-called "digital" DNA (i.e. which could include his cognitive function/cognitive fingerprint), and to differentiate the "digital" DNA of one user from the "digital" DNA of other system users. Since the computer system has knowledge of the real authorized user's cognitive function and cognitive skill levels, the system knows what his capabilities are, and are not. This knowledge can then be used to help make a determination as to whether it is the authorized user with some type of impairment (sleep deprivation, illness, emotional state, alcohol, drugs, a new medication), or whether an intruder is involved. Taking the user's keyboarding skills for example, a user cannot display greater motor skills than he actually possesses. He cannot read faster than he is capable of reading at a given time, nor can he demonstrate language skills he doesn't possess. Changes in a recorded user's cognitive skills will be reflected in his cognitive function baseline over a period of logon attempts, incorporating his new greater skill levels.

Other important observations may be made from this grid including the fact that the user's cognitive function baseline and his cognitive fingerprint represent the same part of the Y axis below the intersection point (which forms the A line segment of the Y axis). That is because the user's cognitive fingerprint is inexorably tied to his cognitive function. The user's previously recorded responses all fall along Line A because his accurate responses over time have formulated this line. The authorized user's current responses should fall on or close to the A line segment while he is in his normal cognitive state. Therefore measurements that represent his normal cognitive function and cognitive fingerprint, or that would represent an improvement in those skills, fall in quadrant 3 on or below the line that represents his working memory (the B line segment of the X axis). That is because the user's cognitive function is limited by his working memory to a great degree. Metrics falling too much above the authorized user's capabilities (i.e. above the 150% line) indicate the person trying to gain access to the system is not the user, or that a machine attack is, or may be, involved. Responses that fall below the user's normal recorded skill levels, would fall in quadrant 4, and if falling too low would indicate a cognitive impairment of some type.

According to studies, cognitive skills are affected differently, depending on the specific impairment involved. Some impairments affect motor skills more than others. Taking sleep deprivation as an example; (1) the effects on performance depend on the type of task to be performed, (2) different characteristics of the task influence the effects, (3) complex tasks are more vulnerable then simpler tasks, and (4) paced tasks deteriorate more than self-paced tasks. Practical examples of vulnerable tasks include serial reactions to defined stimulations, simple sorting operations, the recording of coded messages, copy typing, display monitoring, continuous inspection, performance of a task involving an increasing number of digits, and exercises involving complex coding. Therefore the measurements along the cognitive fingerprint/ cognitive function line for cognitive skills such as reasoning, problem solving, attention, working memory, comprehension, concentration on multi-faceted tasks (how attention is divided between stimuli), perception, demonstrated preferences to key outside variables, forensic awareness, and psychomotor skills may hit right on the accurate response line, slightly off the line, or way off the line. This variance of the skill measured may be within acceptable limits, or it may not. It may also indicate cognitive impairment, or that an intruder is involved. The grid therefore indicates the authorized user's recorded skills, the skills of the authorized user in an impaired state (or an intruder), as well as indicating skill levels that could not belong to the authorized user under any circumstances. By utilizing triangulation on the grid (i.e. plotting an intruder's/impaired user's metrics in relationship to the authorized user's previously recorded metrics, and if applicable the recorded metrics of other authorized user's of the system), and using this in conjunction with additional biometrics that may have been collected during the logon process, if any, a level of confidence may be achieved as to whether or not an intruder is involved. For example, the potential intruder's forensic awareness, and any range of other attributes can be plotted.

The cognitive grid takes into consideration the fact that one person's poorest performance during sleep deprivation may be superior to the best performance of a non-sleep-deprived person through its' ability to measure the user against himself, other authorized users of the system, and the potential intruder. In order to determine if an intruder is involved, or whether it is the authorized user with some type of impairment that affects his cognitive biometric measurements, the scope of the variables presented could be changed to try to determine if sleep deprivation is involved. Simple, but yet attention demanding tasks have proven to be reliable, valid, and sensitive measures of sleep deprivation. Changing the scope from questions to more complex mental exercises could prove beneficial. In other words, cognitive load can be introduced into the equation. Some exercises could be timed, some not timed. Verbal reasoning could be used, and then computational reasoning. For example, if the user's cognitive baseline indicates his working memory allows him to remember seven digits, and the current logon attempt reflects a reduction to only four. It is either the authorized user with some type of impairment, or not the authorized user. If there is a database full of associated information, all kinds of options could be attempted. If a particular measure applies to critical skills needed for his job, one sense of logic would ask if it really matters whether it is the user or somebody else, because either way this user should not be given his normal authorizations. In a mission critical environment, once you have reason to believe an authorized user is impaired, the liability increases exponentially. If a bus company knows that one of their school bus drivers is impaired, there is added liability if they let him drive anyway. But the cognitive grid can be used further to try and resolve the issue. Any one of a number of outcomes offer the opportunity to decline authentication by making the following differentiation for the rejection: "user not recognizable—or user is impaired".

In another embodiment of the invention, the current laws of most states set an arbitrary threshold BAC (i.e. Blood Alcohol Content) level to decide whether a person is legally alcohol impaired. This system has weaknesses. Some of these weaknesses might be avoided by introducing an inexpensive, convenient, easily deployable device that is able to directly measure a user's cognitive function—and compare it to the user's normal cognitive function. This would create the ability to determine whether the user was actually impaired by the amount of alcohol he drank. A user could test himself before driving—he then could decide whether or not to risk driving. Such a device would have the advantage of identifying persons who are unfit to drive a car or whose impairment might affect their performance in other safety-sensitive activities; such impairments as extreme fatigue, illness, an uncharacteristic emotional state, or the use of alcohol, and/or other drugs and medications. A mobile phone utilizing such a software application might prove to be the optimal device.

In yet another embodiment of the invention, an intruder's criminal profile, metrics, and/or unique cognitive biometric fingerprint if captured, could be matched against that of other known criminals on file with law enforcement agencies all over the world, or could be used in big data mining conducted by super computers, that every day scan data from around the world—phone calls, emails, photos, and videos. The data mining concept is that digital information can be analyzed to establish connections between people, and the links can generate investigative leads. Data mining relies on metadata tags that enable algorithms to identify connections. Metadata is data about data. The label placed on data is called a tag. Tagging data is a necessary first step to data mining because it enables analysts to classify and organize the information without examining the content. This is an important legal point in NSA data mining because the communications of US citizens and lawful permanent resident aliens cannot be examined without a warrant. Metadata is not subject to the same rules, so analysts can use it to identify suspicious behavior without fear of breaking the law.

In yet another embodiment of the invention, a computer system may utilize the cognitive grid in conjunction with end stage data mining of the system's daily transactions along with the auditing and systems control procedures already in place, to help detect suspicious actions and/or identify fraudulent activity. If cognitive/behavioral biometric information regarding all authorized users of the system exists (behavioral biometrics includes both physical and non-physical related behavior—see [0016]), and if it is stored using an artificial neural network model that facilitates identifying connections and relationships that exist between the users—see [0084], such as the method of storage of the outside credentials created through the computer program product of this invention, for example, the grid can be used to provide "analytics". These analytics can be plotted on the grid along with the stored user biometric information to identify suspicious insider activity, and for criminal profiling and person identification purposes, by running specific users and/or suspicious activity/transactions through several different screening processes. These processes can be run on an anonymous basis, a group basis, and then narrowed down to a specific individual(s), if the circumstances warrant.

While this invention has been described with reference to illustrative embodiments, this description is not intended to be construed in a limiting sense. Various modifications to the illustrative embodiment will be apparent to those skilled in the art upon reference to this description. It is therefore contemplated that appended claims will cover such modifications or embodiments as fall within the scope of the invention.

We claim:

1. A computer program product comprising at least one non-transitory computer-readable medium tangibly embodying a computer readable program within a computer system having internet and/or intranet connectivity, wherein the computer-readable program when executed following a user's failure to successfully complete a system's normal authentication process or under other suspicious circumstances implements a supplemental distinct authentication/identity management system which: (i) initiates an authorization session and/or otherwise prompts a potential intruder with a cognitive fingerprint screen or page; (ii) which includes one or more outside variables; (iii) forming a basis for one or more unknown shared profiling secrets between the system and an intruder in real time without the intruder knowing exactly what the secret is; (iv) receives and records each response made; (v) plots the response on a cognitive grid; (vi) analyzes the response including grid placement; (vii) transforms each response that exceeds a specified level of accuracy into an outside credential creating usable electronic evidence; (viii) generates data output regarding the outside credential; (ix) initiates a prescribed action based on the outside credential, and; (x) stores data in, and retrieves data from, a target storage area.

2. The computer program product of claim 1, wherein-because the execution of the computer readable program is partially dependent upon an impaired user or an intruder continuing to provide responses to the outside variables presented, a basis for a distinct voluntary self-incriminating authentication/identity management system is formulated which becomes part of a computer system's identity management system that creates the ability to recognize, profile, and potentially identify an authorized or non-authorized user as an intruder.

3. The computer program product of claim 1, wherein during an authorization session the computer program further prompts an intruder with additional cognitive fingerprint screens or pages containing at least one unknown shared profiling secret at certain regular, periodic, or user-initiated intervals.

4. The computer program product of claim 1, wherein the outside credentials created during a logon session when accumulated, form a basis for one or more cognitive/behavioral biometrics.

5. The computer program product of claim 1, wherein the execution of the computer readable program creates an additional layer of security for a computing device and a computer system.

6. The computer program product of claim 1, wherein the execution of the computer readable program creates the ability to recognize a person posing as a specific authorized user as an intruder by the use of a cognitive function/cognitive fingerprint grid which indicates a level of cognitive/behavioral skills that is inconsistent with the capabilities of the user to whom the authentication credentials initially presented for logon purposes belong.

7. The computer program product of claim 1, wherein if an authorized user has presented valid logon credentials and a computer system's base identity management system fails to authenticate him based on recorded biometric measurements, this false rejection shall be designated as: "user not recognizable—or user is impaired".

8. The computer program product of claim 1, wherein execution of the computer readable program creates the ability to identify an intruder at the time of intrusion, and to create usable electronic evidence at the time criminal activity is taking place.

9. The computer program product of claim 1, wherein, a determination is made as to whether an intruder has logged on posing as an authorized user or whether an active logon session has been hijacked to gain access to the system, creating the ability to introduce alternative versions of the four level process to profile and identify the potential intruder.

10. The computer program product of claim 1, wherein the execution of the computer readable program creates the ability to build a criminal profile and ultimately identify an intruder.

11. The computer program product of claim 1, wherein a fingerprint screen or page is presented to a potential intruder forming a basis for one or more unknown shared profiling secrets which are used in determining the intruder's cognitive fingerprint.

12. The computer program product of claim 1, wherein outside credentials that have been created during a logon session are stored in a computer system's memory utilizing an artificial neural network model that focuses on connections and relationships allowing numerous types of pattern recognition and pattern matching searches to be done to create analytics for the purpose of facilitating criminal profiling and personal identification.

13. The computer program product of claim 1, wherein each response made to an outside variable forms a basis for a virtual interview/interrogation process.

14. The computer program product of claim 1, wherein the intruder's forensic awareness and technological knowledge when plotted on the cognitive grid are used to differentiate the intruder from the authorized user he is posing as and from other authorized users.

15. The computer program product of claim 1, wherein to determine whether an intruder is actually an impaired authorized user, outside variables designed to identify a specific type of cognitive impairment are presented.

16. The computer program product of claim 1, wherein a computer system and the computer system's sponsor are safer, because the system is able to recognize that an authorized user is cognitively or otherwise impaired, and as such should be considered to be a danger to the computer system and others and denied access to the system.

17. The computer program product of claim 1 wherein multiple checkpoints that have been created by a multi-factor authentication/identity management system to recognize and authenticate an authorized user, create the ability to profile and identify an intruder who gains at least a threshold level of unauthorized access to the system.

18. The computer program product of claim 1, wherein the execution of the computer readable program creates the ability to capture and identify cognitive/behavioral biometric traits of an intruder at a crime scene, as a crime is being committed.

19. The computer program product of claim 1, wherein execution of the computer readable program creates the ability for a computer system and a suspected intruder to jointly create usable electronic evidence of a specific digital crime at the time a crime in taking place which would not exist otherwise.

* * * * *